United States Patent
Ogawa (12)

(10) Patent No.: US 6,223,261 B1
(45) Date of Patent: Apr. 24, 2001

(54) COMMUNICATION SYSTEM METHOD AND RECORDING APPARATUS FOR PERFORMING ARBITRARY APPLICATION PROCESSING

(75) Inventor: Noriyuki Ogawa, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/124,055

(22) Filed: Jul. 29, 1998

(30) Foreign Application Priority Data

| Jul. 31, 1997 | (JP) | 9-206788 |
| Aug. 6, 1997 | (JP) | 9-212314 |
| Jul. 9, 1998 | (JP) | 10-194697 |

(51) Int. Cl.[7] ................................................ G06F 13/14

(52) U.S. Cl. ............................................................ 711/150

(58) Field of Search ......................... 711/147, 150, 711/154; 710/59; 709/232

(56) References Cited

U.S. PATENT DOCUMENTS

| 4,851,997 | 7/1989 | Tatara ................................. 709/228 |
| 5,537,552 | 7/1996 | Ogasawara et al. ................ 710/57 |
| 5,625,778 | 4/1997 | Childers et al. .................... 710/107 |
| 5,907,717 | * 5/1999 | Ellis .................................... 710/56 |
| 6,023,732 | * 2/2000 | Moh et al. ........................... 709/232 |

FOREIGN PATENT DOCUMENTS

| 0 607 546 A2 | 7/1994 | (EP) . |
| 8-087478 | 4/1996 | (JP) . |
| 91 13397 | 9/1991 | (WO) . |
| 91/13397 | 9/1991 | (WO) . |

OTHER PUBLICATIONS

IBM Technical Disclosure Bulletin, vol. 38, No. 1, High–Performance Multi–Port Frame Forwarding System, Jan. 1, 1995, pp. 53 and 54.

"High–Performance Multi–Port Frame Forwarding System" IBM Technical Disclosure Bulletin, vol. 38, No. 1, Jan. 1, 1995, pp. 53–54.

"Circular Data Buffers with Fast Bypass Path" IBM Technical Disclosure Bulleting, vol. 37, No. 4A, Apr. 1, 1994, p. 15.

Tamir y et al.: "High–Performance Multi–Queue Buffers for CLSI Communication Swiches" Proceedings of the Annual International Symposium on Computer Architecture, Honolulu, May 30–Jun. 2, 1988.

Patent Abstract of Japan vol. 096, No. 008, Aug. 30, 1996 & JP 08 087478 A (Nippon Telegr & Teleph Corp & LT;NTT>) Apr. 2, 1996 Abstract.

\* cited by examiner

Primary Examiner—Kevin L. Ellis
(74) Attorney, Agent, or Firm—Wenderoth, Lind & Ponack, L.L.P.

(57) ABSTRACT

The present invention relates to communications in which transmit data generated in processes in which a utilization portion performs arbitrary application processing are transmitted to an exterior in accordance with a previously determined protocol in a control portion. A RAM comprises a transmission buffer and a management table for managing a state where each of the transmit data, whose request for transmission has been accepted by the control portion, is transmitted and the location, on the transmission buffer, of the transmit data. The utilization portion outputs, when the transmit data is generated, a request to acquire a data write area to the control portion. Correspondingly, the control portion refers to the management table, to specify a data write area where writing is newly allowed in the transmission buffer and present the specified data write area to the utilization portion. The utilization portion writes the transmit data into the presented data write area.

18 Claims, 27 Drawing Sheets

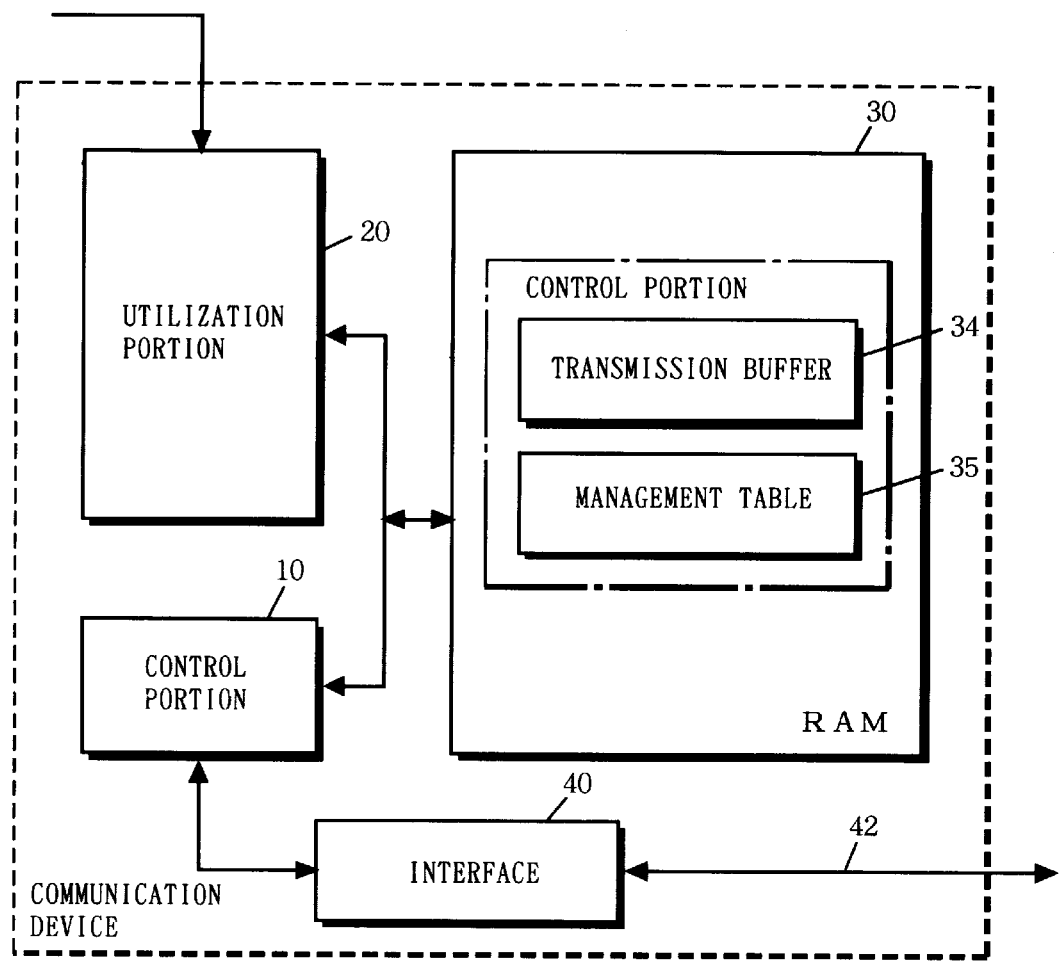

FIG. 3

| HEADER INFORMATION WRITE AREA | LOCATION OF TRANSMIT DATA 1 | SIZE OF TRANSMIT DATA 1 | ENDER INFORMATION WRITE AREA |
|---|---|---|---|
| HEADER INFORMATION WRITE AREA | LOCATION OF TRANSMIT DATA 2 | SIZE OF TRANSMIT DATA 2 | ENDER INFORMATION WRITE AREA |
| HEADER INFORMATION WRITE AREA | LOCATION OF TRANSMIT DATA 3 | SIZE OF TRANSMIT DATA 3 | ENDER INFORMATION WRITE AREA |
| HEADER INFORMATION WRITE AREA | LOCATION OF TRANSMIT DATA 4 | SIZE OF TRANSMIT DATA 4 | ENDER INFORMATION WRITE AREA |
| HEADER INFORMATION WRITE AREA | LOCATION OF TRANSMIT DATA 5 | SIZE OF TRANSMIT DATA 5 | ENDER INFORMATION WRITE AREA |
| HEADER INFORMATION WRITE AREA | LOCATION OF TRANSMIT DATA 6 | SIZE OF TRANSMIT DATA 6 | ENDER INFORMATION WRITE AREA |
| HEADER INFORMATION WRITE AREA | LOCATION OF TRANSMIT DATA 7 | SIZE OF TRANSMIT DATA 7 | ENDER INFORMATION WRITE AREA |
| HEADER INFORMATION WRITE AREA | LOCATION OF TRANSMIT DATA 8 | SIZE OF TRANSMIT DATA 8 | ENDER INFORMATION WRITE AREA |

| USE STATE FLAG | SIZE OF TRANSMISSION DATA 1 | HEADER INFORMATION WRITE AREA | WRITE AREA OF TRANSMIT DATA 1 | ENDER INFORMATION WRITE AREA |
|---|---|---|---|---|
| USE STATE FLAG | SIZE OF TRANSMISSION DATA 2 | HEADER INFORMATION WRITE AREA | WRITE AREA OF TRANSMIT DATA 2 | ENDER INFORMATION WRITE AREA |
| USE STATE FLAG | SIZE OF TRANSMISSION DATA 3 | HEADER INFORMATION WRITE AREA | WRITE AREA OF TRANSMIT DATA 3 | ENDER INFORMATION WRITE AREA |
| USE STATE FLAG | SIZE OF TRANSMISSION DATA 4 | HEADER INFORMATION WRITE AREA | WRITE AREA OF TRANSMIT DATA 4 | ENDER INFORMATION WRITE AREA |
| USE STATE FLAG | SIZE OF TRANSMISSION DATA 5 | HEADER INFORMATION WRITE AREA | WRITE AREA OF TRANSMIT DATA 5 | ENDER INFORMATION WRITE AREA |
| USE STATE FLAG | SIZE OF TRANSMISSION DATA 6 | HEADER INFORMATION WRITE AREA | WRITE AREA OF TRANSMIT DATA 6 | ENDER INFORMATION WRITE AREA |
| USE STATE FLAG | SIZE OF TRANSMISSION DATA 7 | HEADER INFORMATION WRITE AREA | WRITE AREA OF TRANSMIT DATA 7 | ENDER INFORMATION WRITE AREA |
| USE STATE FLAG | SIZE OF TRANSMISSION DATA 8 | HEADER INFORMATION WRITE AREA | WRITE AREA OF TRANSMIT DATA 8 | ENDER INFORMATION WRITE AREA |

36

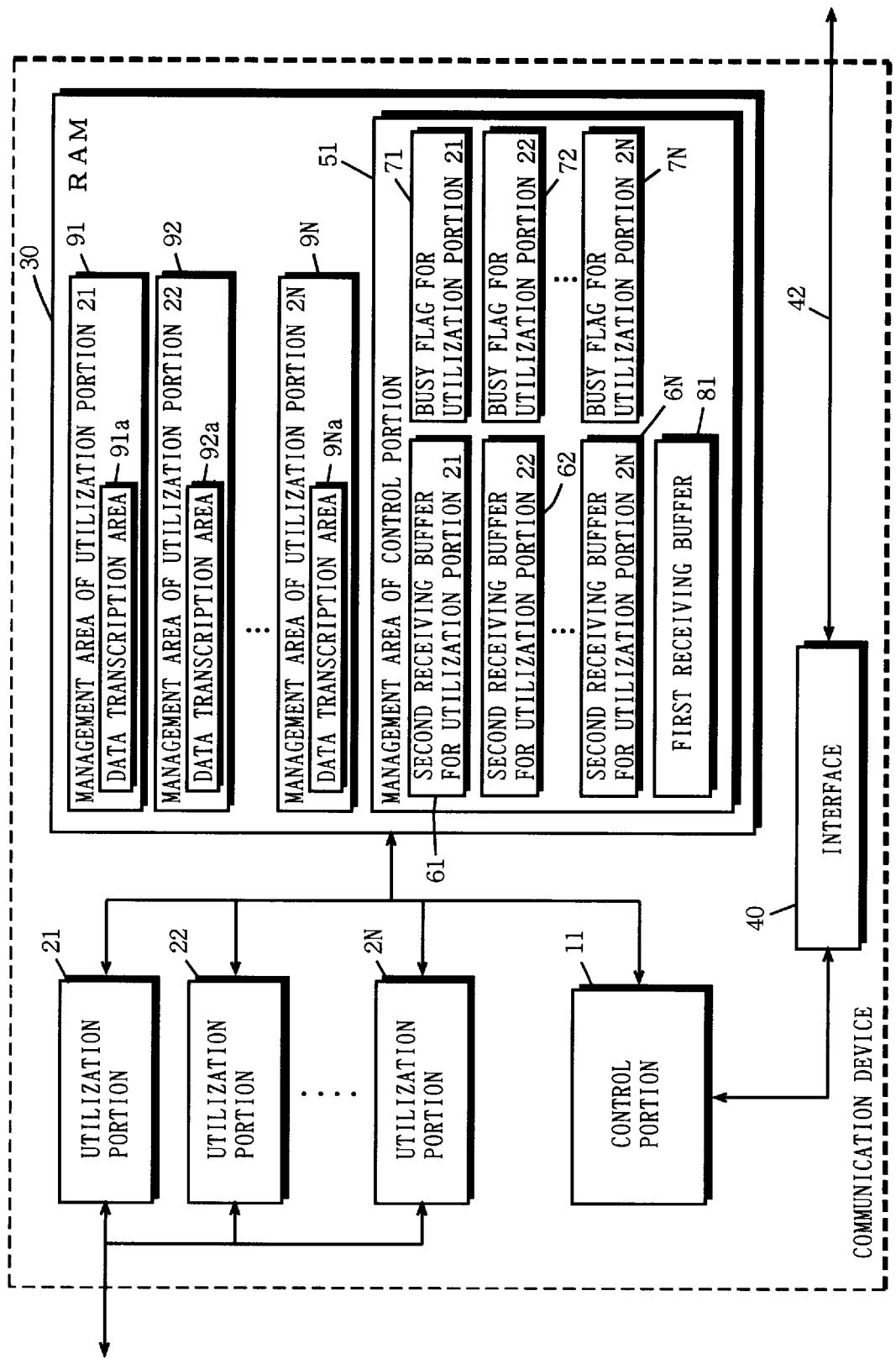

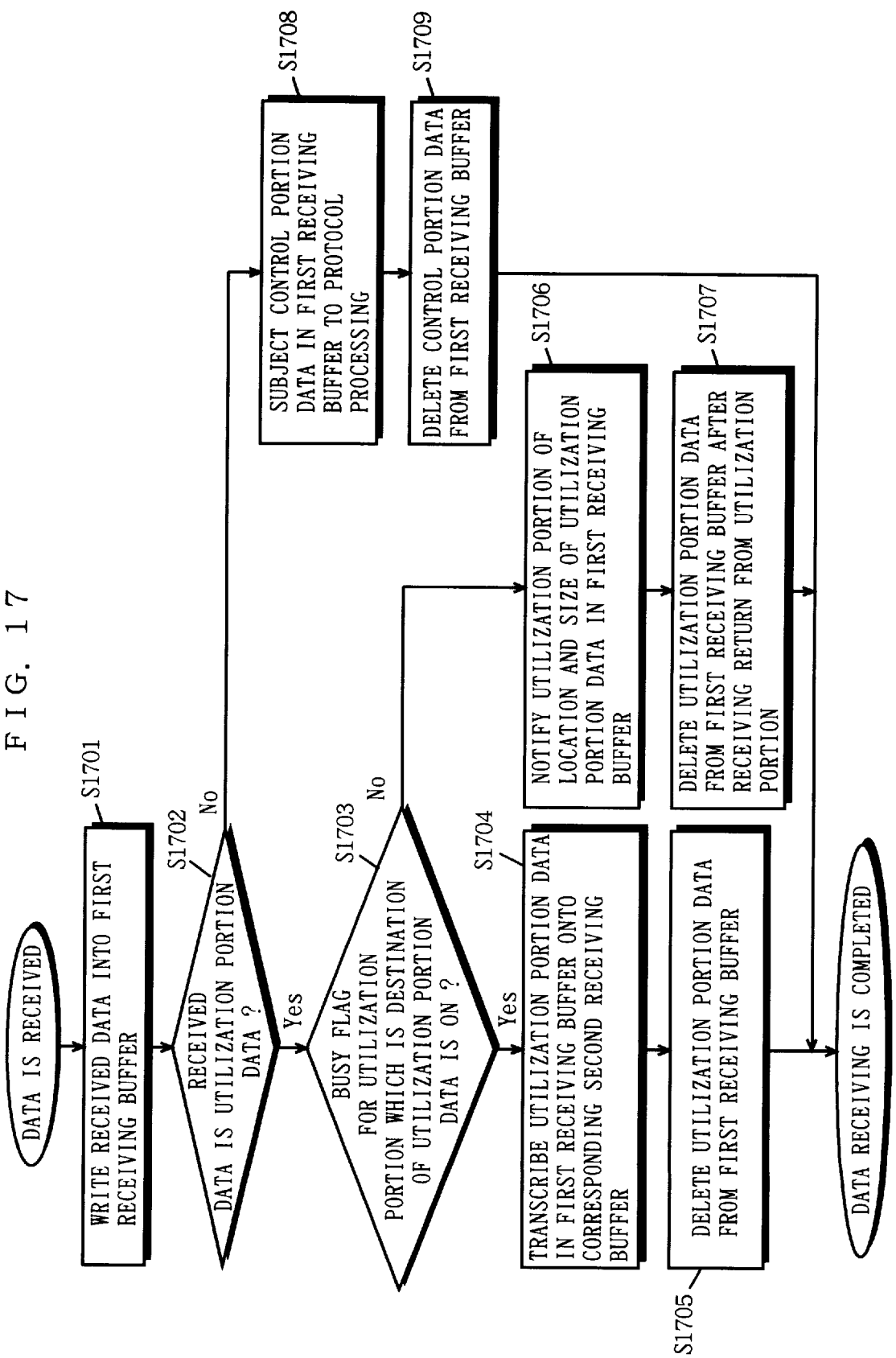

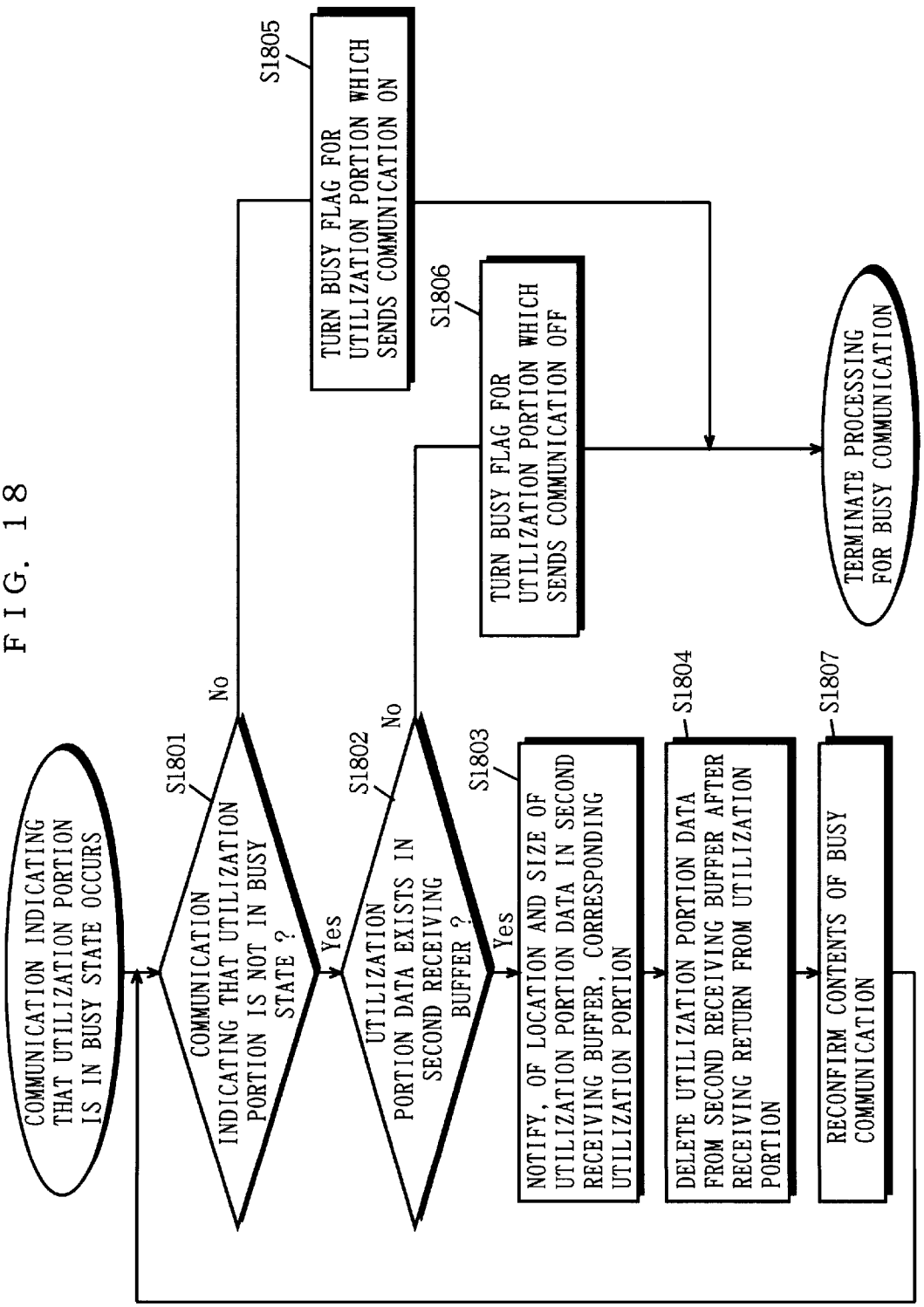

FIG. 22

| |
|---|
| UTILIZATION PORTION RELATED INFORMATION |
| BUSY FLAG |
| LOCATION OF SECOND RECEIVING BUFFER |
| SIZE OF SECOND RECEIVING BUFFER |
| LOCATION FOR WRITING IN SECOND RECEIVING BUFFER |
| LOCATION FOR READING IN SECOND RECEIVING BUFFER |
| SIZE FOR READING IN SECOND RECEIVING BUFFER |

| WRITE AREA OF TRANSMISSION DATA 1 |
| WRITE AREA OF TRANSMISSION DATA 2 |
| WRITE AREA OF TRANSMISSION DATA 3 |
| WRITE AREA OF TRANSMISSION DATA 4 |
| WRITE AREA OF TRANSMISSION DATA 5 |
| WRITE AREA OF TRANSMISSION DATA 6 |
| WRITE AREA OF TRANSMISSION DATA 7 |
| WRITE AREA OF TRANSMISSION DATA 8 |

| LOCATION OF TRANSMIT DATA 1 |
| LOCATION OF TRANSMIT DATA 2 |
| LOCATION OF TRANSMIT DATA 3 |
| LOCATION OF TRANSMIT DATA 4 |
| LOCATION OF TRANSMIT DATA 5 |
| LOCATION OF TRANSMIT DATA 6 |
| LOCATION OF TRANSMIT DATA 7 |
| LOCATION OF TRANSMIT DATA 8 |

FIG. 27 PRIOR ART

| HEADER INFORMATION WRITE AREA | LOCATION OF TRANSMIT DATA 1 | SIZE OF TRANSMIT DATA 1 | ENDER INFORMATION WRITE AREA |
| --- | --- | --- | --- |
| HEADER INFORMATION WRITE AREA | LOCATION OF TRANSMIT DATA 2 | SIZE OF TRANSMIT DATA 2 | ENDER INFORMATION WRITE AREA |
| HEADER INFORMATION WRITE AREA | LOCATION OF TRANSMIT DATA 3 | SIZE OF TRANSMIT DATA 3 | ENDER INFORMATION WRITE AREA |
| HEADER INFORMATION WRITE AREA | LOCATION OF TRANSMIT DATA 4 | SIZE OF TRANSMIT DATA 4 | ENDER INFORMATION WRITE AREA |
| HEADER INFORMATION WRITE AREA | LOCATION OF TRANSMIT DATA 5 | SIZE OF TRANSMIT DATA 5 | ENDER INFORMATION WRITE AREA |
| HEADER INFORMATION WRITE AREA | LOCATION OF TRANSMIT DATA 6 | SIZE OF TRANSMIT DATA 6 | ENDER INFORMATION WRITE AREA |
| HEADER INFORMATION WRITE AREA | LOCATION OF TRANSMIT DATA 7 | SIZE OF TRANSMIT DATA 7 | ENDER INFORMATION WRITE AREA |
| HEADER INFORMATION WRITE AREA | LOCATION OF TRANSMIT DATA 8 | SIZE OF TRANSMIT DATA 8 | ENDER INFORMATION WRITE AREA |

1033

COMMUNICATION SYSTEM METHOD AND RECORDING APPARATUS FOR PERFORMING ARBITRARY APPLICATION PROCESSING

BACKGROUND OF THE INVENTION

1. Field of the Invention

The present invention relates generally to a communication device, and more particularly, to a communication device comprising a utilization portion for performing arbitrary application processing, a control portion for performing processing in accordance with a previously determined protocol, and a memory which is shared between the utilization portion and the control portion, a communication method, and a medium on which a computer program for carrying out the method is recorded.

2. Description of the Background Art

In a communication device comprising a utilization portion for performing arbitrary application processing, a control portion for performing processing in accordance with a previously determined protocol, and a memory which is shared between the utilization portion and the control portion, the control portion transmits transmit data generated in the utilization portion in accordance with the previously determined communication protocol. In the communication device, when large amounts of transmit data are generated in the utilization portion for a short time period at a speed exceeding the communication speed of the control portion, the transmit data may be discarded without being transmitted. Therefore, the conventional communication device has a transmission buffer provided therein, and employs a method of temporarily storing transmit data in the transmission buffer to absorb the overflow of the transmit data.

Description is now made of the conventional communication device which is provided with the transmission buffer.

FIG. 24 is a block diagram showing an example of the structure of a transmission portion in the conventional communication device. In FIG. 24, the communication device comprises a control portion 1010, a utilization portion 1020, a RAM (Random Access Memory) 1030, and an interface 1040.

The control portion 1010 executes a previously determined communication protocol. Although the utilization portion 1020 performs application processing, no service for using is specified on the communication protocol. That is, a user can use an arbitrary application program in the utilization portion 1020.

The RAM 1030 is used as a working memory of the control portion 1010 and the utilization portion 1020. The RAM 1030 has, as ones related to transmit data, a transmission buffer 1031, a transmit data management table 1032, and an untransmitted data management table 1033. The transmission buffer 1031 and the transmit data management table 1032 are under the management of the utilization portion 1020. On the other hand, the untransmitted data management table 1033 is under the management of the control portion 1010. The details of the transmission buffer 1031, the transmit data management table 1032, and the untransmitted data management table 1033 will be described later.

The control portion 1010 is connected to a communication line 1042 through the interface 1040. The interface 1040 includes a modem or the like, and mediates communication between the communication device shown in FIG. 24 and another communication device (not shown).

FIG. 25 is a diagram showing the structure of the transmission buffer 1031 shown in FIG. 24. Transmit data generated in the utilization portion 1020 is written into the transmission buffer 1031. In FIG. 25, eight transmit data are written, as an example, into the transmission buffer 1031.

FIG. 26 is a diagram showing the structure of the transmit data management table 1032 shown in FIG. 24. The location of each of the transmit data written into the transmission buffer 1031 is contained in the transmit data management table 1032 as shown in FIG. 25 (specifically, a head address in a write area of the each of the transmit data in the transmission buffer 1031).

FIG. 27 is a diagram showing the each of the structure of the untransmitted data management table 1033 shown in FIG. 24. The untransmitted data management table 1033 stores the location of each of the transmit data whose request for transmission has been accepted (a head address in a write area of the each of the transmit data in the transmission buffer 1031) and the size thereof. Further, a header information write area and an ender information write area are provided in relation to the location and the size of each of the transmit data.

FIG. 28 is a flow chart showing a part of operations performed by the utilization portion 1020 shown in FIG. 24. FIGS. 29 and 30 are flow charts showing parts of operations performed by the control portion 1010 shown in FIG. 24.

Referring now to FIGS. 28 to 30, description is made of a series of operations performed from the time when transmit data is generated until it is transmitted in the communication device shown in FIG. 24.

FIG. 28 will be referred to. The utilization portion 1020 judges, when transmit data is generated (step S2801), whether the transmission of the transmit data is the first transmission or the second or later transmission (step S2802). In the case of the first transmission, the utilization portion 1020 judges whether or not the transmit data management table 1032 has a space (step S2803). In the first transmission, the transmit data management table 1032 is empty, so that the result of the judgment is "YES", after which the program proceeds to the step S2804. At the step S2804, the utilization portion 1020 judges whether or not a write area in which transmit data is to be newly written can be ensured in the transmission buffer 1031. In the first transmission, the transmission buffer 1031 is empty, so that the result of the judgment is "YES", after which the program proceeds to the step S2805. At the step S2805, the utilization portion 1020 ensures a write area in which transmit data is to be newly written in the transmission buffer 1031, to add the location (a head address) of the ensured write area to the transmit data management table 1032. The utilization portion 1020 then writes transmit data generated at that time into the newly ensured write area in the transmission buffer 1031 (step S2806). The utilization portion 1020 then prepares a data transmission request (step S2807). The data transmission request includes the location of the transmit data newly written into the transmission buffer 1031 and the size thereof. The data transmission request is outputted to the control portion 1010 at the step S2808.

FIG. 29 will be referred to. The control portion 1010 adds, when it receives the data transmission request from the utilization portion 1020 (step S2901), the location and the size of the transmit data (both are included in the data transmission request) to the untransmitted data management table 1033 (step S2902). The control portion 1010 then writes header information of a packet to be later generated in a header information write area in the same column as a column to which the location and the size of the transmit data are added at the step S2902 (step S2903). Further, the control portion 1010 then writes ender information of the packet to be later generated in an ender information write area in the same column (step S2904). The control portion 1010 then judges whether or not the communication device is currently in a transmittable state (step S2905). Such judgment is required because the communication device shown in FIG. 24 makes half-duplex transmission, for example, so that it cannot transmit the transmit data while receiving transmit data from a communication device at the destination of communication (not shown). The control portion 1010 performs processing at the step S2906 immediately when transmission is possible, while performing the processing after waiting, when transmission is impossible, until there occurs a state where transmission is possible. At the step S2906, the control portion 1010 generates a packet for the oldest transmit data out of the transmit data, which have not been transmitted yet, registered in the untransmitted data management table 1033, and transmits the packet to the communication device at the destination of communication. The packet is constituted by header information, transmit data, and ender information. The header information and the ender information are taken out of the untransmitted data management table 1033. The transmit data is taken out of the transmission buffer 1031 (more specifically, out of a write area specified by the location of the transmit data stored in the untransmitted data management table 1033). The control portion 1010 then judges whether or not acknowledgment (ACK) of arrival of the transmit data is returned from the communication device at the destination of communication (step S2907). When the ACK is not returned, the program is returned to the step S2906. At the step S2906, the control portion 1010 generates and resends the same packet. On the other hand, when the ACK is returned, the control portion 1010 judges that the transmission of the packet is terminated, and deletes information, relating to the packet whose transmission is terminated (header information, the location of the transmit data, the size of the transmit data, ender information) from the untransmitted data management table 1033 (step S2908). The transmission processing in the control portion 1010 is thus terminated.

FIG. 28 will be referred to again. When transmit data is generated in the utilization portion 1020, the transmission of the transmit data at this time is the second or later transmission, so that the program proceeds to the step S2809. At the step S2809, the utilization portion 1020 requires confirmation of a status of the control portion 1010. The status indicates the situation where transmission processing in the control portion 1010 progresses.

FIG. 30 will be referred to. The control portion 1010 takes out, when it receives a status confirmation request from the utilization portion 1020 (step S3001), all the locations of the transmit data which are stored in the untransmitted data management table 1033, to produce a status (step S3002), and sends the produced status to the utilization portion 1020 (step S3003). The confirmation processing of the status in the control portion 1010 is thus terminated.

FIG. 28 will be referred to again. The utilization portion 1020 judges, when it receives the status from the control portion 1010, whether or not there is transmit data whose transmission in the control portion 1010 is completed out of the transmit data written into the transmission buffer 1031 (step S2810). This judgment is made by examining transmit data whose location is stored in the transmit data management table 1032 but does not exist in the status. When transmit data which has been already transmitted exists in the transmission buffer 1031, the utilization portion 1020 writes the transmit data into one of write areas storing the transmit data which has been already transmitted, and overwrites the location of the transmit data (a head address in the write area) on a corresponding column in the transmit data management table 1032 (step S2811). The utilization portion 1020 then deletes the location of transmit data whose transmission is confirmed at the foregoing step S2811 and other than the transmit data written this time into the transmission buffer 1031 (step S2812). The utilization portion 1020 then prepares a data transmission request (including the location and the size of the transmit data written at that time into the transmission buffer 1031) (step S2807). The data transmission request is outputted to the control portion 1010 at the step S2808.

On the other hand, when there exists no transmit data whose transmission is completed in the transmission buffer 1031 at the foregoing step S2810, the program proceeds to the step S2803. At the step S2803, the utilization portion 1020 judges whether or not the transmit data management table 1032 is empty. When the transmit data management table 1032 is not empty, the program is returned to the step S2809. At the step S2809, the utilization portion 1020 confirms the status in the control portion 1010 again. On the other hand, when the transmit data management table 1032 is empty, the utilization portion 1020 judges whether or not a write area in which transmit data is to be newly written can be ensured in the transmission buffer 1031 (step S2804). When a write area in which transmit data is to be newly written cannot be ensured, the program is returned to the step S2809. At the step S2809, the utilization portion 1020 confirms the status in the control portion 1010 again. On the other hand, when a write area in which transmit data is to be newly written can be ensured, the utilization portion 1020 ensures a write area in which transmit data is to be newly written in the transmission buffer 1031, and adds the location (a head address) of the ensured write area to the transmit data management table 1032 (step S2805). The utilization portion 1020 then writes transmit data generated at that time in the newly ensured transmit data write area in the transmission buffer 1031 (step S2806). The utilization portion 1020 then prepares a data transmission request (including the location and the size of the transmit data written at that time in the transmission buffer 1031) (step S2807). The data transmission request is outputted to the control portion 1010 at the step S2808. Operations, which respond to the data transmission request, performed by the control portion 1010 are the same as those in the case of the above-mentioned first transmission.

On the other hand, in a communication device comprising a utilization portion for performing arbitrary application processing, a control portion for performing processing in accordance with a previously determined protocol, and a memory which is shared between the utilization portion and the control portion, when data is received, the data received in the control portion is processed upon being transferred to the utilization portion. In the communication device, the overflow of the received data from the control portion may occur due to the delay of data processing in the utilization portion. Therefore, the conventional communication device employs a method of providing a receiving buffer in the control portion and temporarily storing the received data therein, to restrain the overflow of the received data.

In the conventional communication device employing the above-mentioned method will be described below.

FIG. 31 is a block diagram showing an example of the structure of a receiving portion in the conventional communication device. In FIG. 31, the communication device comprises a control portion 1011, a plurality of utilization portions 1021 to 102N, a RAM 10310, and an interface 1040.

The control portion 1011 executes a previously determined communication protocol. The control portion 1011 is connected to a communication line 1042 through the interface 1040. The interface 1040 includes a modem or the like, and mediates communication between the communication device shown in FIG. 31 and another communication device (not shown).

Although the utilization portions 1021 to 102N perform application processing, no service for using is specified on the communication protocol. That is, a user can use an arbitrary application program in the utilization portions 1021 to 102N.

The RAM 1030 is used as a working memory of the control portion 1011 and the utilization portions 1021 to 102N, and comprises a control portion management area 1051 which is managed by the control portion 1011 and utilization portion management areas 1091 to 109N which are respectively managed by the utilization portions 1021 to 120N. Further, the control portion management area 1051 comprises a first receiving buffer 1081, and second receiving buffers 1061 to 106N, respectively, corresponding to the utilization portions 1021 to 102N. The first receiving buffer 1081 has one record area, and data received under an instruction from the control portion 1011 is recorded on the one record area. Each of the second receiving buffers 1061 to 106N has a plurality of record areas, and the received data stored in the first receiving buffer 1081 is transcribed onto the plurality of record areas under an instruction from the control portion 1011, as required. The utilization portion management areas 1091 to 109N, respectively include data transcription areas 1091a to 109Na. The utilization portions 1021 to 102N transcribe utilization portion data which have been transcribed on the corresponding second receiving buffers 1061 to 106N onto the data transcription areas 1091a to 109Na, respectively.

Data transmitted and received in the conventional communication device takes a form called a packet. The packet is constituted by a header part, a data part and an ender part. In data transmitted with using the data part, there exist control portion data which is subjected to protocol processing in the control portion 1011 and utilization portion data which are respectively subjected to application processing in the utilization portions 1021 to 102N.

A series of operations performed from the time when data is received until application processing is performed in the communication device shown in FIG. 31 will be described using FIGS. 32 and 33. FIG. 32 is a flow chart showing processing steps carried out when the control portion 1011 receives data. FIG. 33 is a flow chart showing processing steps carried out by the control portion 1011 when busy communication from each of the utilization portions 1021 to 102N occurs.

FIG. 32 will be referred to. The control portion 1011 first writes, when data is received, the received data (actually, the data part of the received packet) into the first receiving buffer 1081 (step S3201). As the premise of the start of processing, the first receiving buffer 1081 and the second receiving buffers 1061 to 106N are initialized. The control portion 1011 judges whether or not the data part written into the first receiving buffer 1081 is utilization portion data (step S3202). In the judgment at the step S3202, when the data part is not utilization portion data, that is, control portion data, the control portion 1011 subjects the control portion data to protocol processing (step S3208), and deletes the control portion data from the first receiving buffer 1081 after the processing (step S3209).

On the other hand, in the judgment at the foregoing step S3202, when the data part is utilization portion data, the control portion 1011 transcribes the utilization portion data written into the first receiving buffer 1081 onto the corresponding second receiving buffer 106i (i=any one of 1 to N. The same shall apply hereinafter) (step S3203), and deletes the utilization portion data from the first receiving buffer 1081 (step S3204). Thereafter, the control portion 1011 judges whether or not the utilization portion 102i for processing the utilization portion data is in a busy state (a state where processing is being performed, and a new processing request cannot be accepted) with using a flag or the like (step S3205).

In the judgment at the step S3205, when the utilization portion 102i is not in a busy state, the control portion 1011 notifies the utilization portion 102i of the receiving of the location of the utilization portion data written into the second receiving buffer 106i (specifically, a head address in a write area of the received data) and the size thereof (step S3206). Thereafter, the control portion 1011 deletes the utilization portion data, of which the utilization portion 102i has been notified, from the second receiving buffer 106i (step S3207). The utilization portion 102i performs processing for transcribing utilization portion data onto the data transcription area 109ia managed by itself from the second receiving buffer 106i upon receipt of the notification of the receiving in a period elapsed from the processing at the step S3206 to the processing at the step S3207, which is not illustrated. On the other hand, when the corresponding utilization portion 102i is in a busy state in the judgment at the aforementioned step S3205, the control portion 1011 terminates the receiving processing.

Since the receiving processing was terminated because the utilization portion 102i was in a busy state, when the busy state in the utilization portion 102i is released, the control portion 1011 sends the above-mentioned notification of the receiving to the utilization portion 102i by communication relating to the busy state (hereinafter referred to as busy communication) from the utilization portion 102i, as shown in FIG. 33.

FIG. 33 will be referred to. The control portion 1011 judges, when it receives the busy communication from the utilization portion 102i, whether or not the communication is communication indicating that the utilization portion 102i is not in a busy state (step S3301). In a case where in the judgment at the step S3301, the communication is communication indicating that the utilization portion 102i is not in a busy state, the control portion 1011 further judges whether or not utilization portion data exists in the second receiving buffer 106i (step S3302). On the other hand, in a case where in the judgment at the step S3301, the communication is not communication indicating that the utilization portion 102i is not in a busy state, the control portion 1011 terminates the processing for the busy communication.

When the utilization portion data exists in the second receiving buffer 106i in the judgment at the aforementioned step S3302, the control portion 1011 notifies the utilization portion 102i of the receiving of the location, in which the utilization portion data is written, on the RAM 1030 and the size thereof (step S3303). Thereafter, the control portion 1011 deletes the utilization portion data from the second receiving buffer 106i (step S3304). It is also considered that the transition of the utilization portion 102*i* to the busy state immediately occurs by the notification made at the step S3303, so that the control portion 1011 reconfirms the contents of the busy communication after the utilization portion data is deleted at the step S3304 (step S3305). Therefore, the program is returned to the step S3301. At the step S3301, the confirmed contents of the communication are judged. In the case of the contents of the communication indicating that the utilization portion 102*i* is in a busy state, the processing for the busy communication is terminated. In the case of the contents of the communication indicating that the utilization portion 102*i* is not in a busy state, it is further judged whether or not the utilization portion data exists in the second receiving buffer 106*i*. The utilization portion 102*i* performs processing for transcribing the utilization portion data onto the data transcription area 109*ia* managed by itself from the second receiving buffer 106*i* upon receipt of the notification in a period elapsed from the processing at the step S3303 to the processing at the step S3304, which is not illustrated. On the other hand, when the utilization portion data does not exist in the second receiving buffer 106*i* in the judgment at the step S3302, the control portion 1011 terminates the processing for the busy communication.

As a method of restraining the overflow of the received data, the communication device which is provided with the second receiving buffer 106*i* was described. In a case where data, whose amounts are not less than the size of the receiving buffer 106*i*, are transmitted to the communication device, however, even if the data is received, the data cannot be written into the second receiving buffer 106*i*. As a result, deficiency of the data arises.

In order to cope therewith, there is such a method that a communication device on the receiving side communicates the total amount of data which can be stored in a buffer (corresponding to the part of the second receiving buffer 106*i* in FIG. 31) even if the utilization portion 102*i* is in a busy state to a communication device on the transmission side before communication is started in the form of a credit value as described later.

This method utilizes the fact that the maximum size of data in a communication packet (which is the maximum value of data which can be carried in one packet transmission) is previously determined in the stages of the construction of a communication system. Specifically, the size of an area in the RAM 1030 which can store received data, that is, the second receiving buffer 106*i* divided by the maximum data size is found. The communication device on the receiving side communicates the result of the division to the communication device on the transmission side before communication is started as the number of times packet receiving (packet transmission on the receiving side) can be continuously made. A value representing the number of times packet receiving (transmission) can be continuously made is referred to as a credit value. Particularly, its maximum value is referred to as the maximum credit value. The communication device on the transmission side which has received the maximum credit value decreases the credit value by one at a time by itself every time it transmits one packet, to stop the packet transmission at the time point where the credit value becomes zero. The communication device on the transmission side waits until the subsequent credit value is communicated from the communication device on the receiving side. Consequently, the communication device on the receiving side does not unuselessly receive data not less than the allowable amount of data which can be processed by itself (stored in the receiving buffer), so that deficiency of the received data can be prevented from arising, for example.

As described in the foregoing, in the conventional communication device, the transmission buffer 1031 is managed by the utilization portion 1020. However, the transmission processing of the transmit data is performed in the control portion 1010, so that the utilization portion 1020 cannot directly know which of the transmit data in the transmission buffer 1031 has been transmitted. In the conventional communication device, therefore, the control portion 1010 judges which of the transmit data whose request for transmission has been accepted has not been transmitted yet, manage the judgment using the untransmitted data management table 1033, and transmits the result of the management to the utilization portion 1020 as a status. Consequently, the utilization portion 1020 can know which of the transmit data in the transmission buffer 1031 has been transmitted, and can write new transmit data in a portion storing the transmit data.

In the above-mentioned configuration, however, every time transmit data is newly generated, the utilization portion 1020 must inquire a status of the control portion 1010, and the control portion 1010 must produce a status on the basis of the data recorded on the untransmitted data management table 1033 in response to the inquiry and send the produced status to the utilization portion 1020. Further, the utilization portion 1020 must manage the location of the transmit data in the transmission buffer 1031 by using the transmit data management table 1032, to specify the location of a write area storing transmit data which has been transmitted in the transmission buffer 1031 from the sent status. Therefore, the conventional communication device requires complicated processing for managing the transmission buffer 1031, so that a load on the whole communication device becomes heavy because the transmission buffer 1031 is managed in a distributed manner by the utilization portion 1020 and the control portion 1010.

In the conventional communication device, the utilization portion 1020 is in charge of a part of the management of the transmission buffer 1031, so that a processing load on the utilization portion becomes heavy. As a result, a large amount of time and high cost are required to develop a new application program. Since the application program includes processing other than the processing originally expected, it cannot be expected that the processing originally expected is quickly performed, so that the communication device is inconvenient for a user.

On the other hand, in the conventional communication device, two receiving buffers, that is, the first receiving buffer 1081 (for receiving of data and assignment to the control portion/the utilization portions) and the second receiving buffers 1061 to 106N (for storing utilization portion data as anti-overflow measures) are interposed before the received utilization portion data is subjected to application processing in the utilization portions 1021 to 102N. In the aforementioned conventional communication device, therefore, two data transcription (data transcription from the first receiving buffer 1081 to the second receiving buffers 1061 to 106N, and data transcription from the second receiving buffers 1061 to 106N to the data transcription areas 1091*a* to 109N*a*) are required in processing one received data. Consequently, the conventional communication device is inferior in communication throughput.

In the above-mentioned conventional communication device, the size of the second receiving buffer 106*i* is identical and fixed under the management of the control portion 1011 irrespective of different objects and processing capabilities of the utilization portions 1021 to 102N. Therefore, the size of the second receiving buffer 106*i* is too large and useless depending on the utilization portion 102*i*, while being too small, causing deficiency of data in some cases.

Furthermore, the conventional communication device which communicates the above-mentioned credit value, the fixed size of the second receiving buffer 106*i* is divided by the previously determined maximum data size in the communication packet, thereby finding the maximum credit value. Therefore, the maximum credit value is a constant value, although the data size varies for each communication, so that no efficient and most suitable data communication is established depending on communication.

SUMMARY OF THE INVENTION

Therefore, an object of the present invention is to provide a communication device which can manage a transmission buffer in simple processing, is convenient for a user, improves communication throughput in its restricted resources, and attempts to use the resources most suitably.

In order to attain the above-mentioned object, the present invention has the following features.

A first aspect is directed to a communication device comprising a utilization portion for performing arbitrary application processing, a control portion for transmitting transmit data generated in the utilization portion to an exterior in accordance with a previously determined protocol, and a memory which is shared between the utilization portion and the control portion, characterized in that the memory comprises a transmission buffer having a plurality of data write areas for temporarily storing the transmit data generated in the utilization portion, and a management table for managing a state where each of the transmit data, whose request for transmission from the utilization portion has been accepted by the control portion, is transmitted and the location, on the transmission buffer, of the transmit data, the utilization portion outputs, when the transmit data is generated, a request to acquire the data write area in the transmission buffer to the control portion, the control portion refers, when the request for acquisition is issued, to the transmission buffer, to specify the data write area where writing is newly allowed in the transmission buffer and present the data write area to the utilization portion, the utilization portion writes the transmit data into the data write area, which has been presented from the control portion, in the transmission buffer, and the control portion registers, in a case of accepting the request to transmit the transmit data from the utilization portion, the location, on the transmission buffer, of the transmit data in the management table.

As described in the foregoing, according to the first aspect, the utilization portion only issues the request to acquire the write area to the control portion, and the transmission buffer is entirely managed by the control portion. Therefore, the amount of data exchanged between the utilization portion and the control portion is made smaller, as compared with that in the conventional communication device, so that a load on the whole communication device is reduced. The utilization portion can be devoted to performance of application processing originally expected, thereby improving the speed at which the application processing is performed. Further, an application program for realizing the utiliation portion is simplified, thereby making it possible to save time and cost required for its development.

A second aspect is directed to a communication device comprising a utilization portion for performing arbitrary application processing, a control portion for transmitting transmit data generated in the utilization portion to the exterior in accordance with a previously determined protocol, and a memory which is shared between the utilization portion and the control portion, characterized in that the memory comprises a transmission buffer having a plurality of data write areas for temporarily storing the transmit data generated in the utilization portion, and a header information write area and an ender information write area which are provided in relation to each of the data write areas, for further managing a state where the transmit data stored in the data write area is transmitted, the utilization portion outputs, when the transmit data is generated, a request to acquire the data write area in the transmission buffer to the control portion, the control portion refers, when the request for acquisition is issued, to the transmission buffer, to specify the data write area where writing is newly allowed in the transmission buffer and present the data write area to the utilization portion, the utilization portion writes the transmit data into the data write area, which has been presented from the control portion, in the transmission buffer, and the control portion respectively writes header information and ender information into the header information write area and the ender information write area in processes carried out after accepting a request to transmit the transmit data from the utilization portion until the transmission of a packet including the transmit data is started, to complete the transmitting packet in the transmission buffer.

As described in the foregoing, according to the second aspect, one transmission buffer is caused to have the respective functions of the transmission buffer and the management table in the first aspect. Therefore, it is not necessary to link the data between the transmission buffer and the management table as in the first aspect, so that the amount of data stored is reduced (specifically, the location of the transmit data need not be stored). According to the second aspect, the transmitting packet is completed in the transmission buffer. Therefore, the transmit data need not be transcribed, thereby simplifying processing for producing the packet.

A third aspect is directed to a communication device comprising a utilization portion for performing arbitrary application processing, a control portion for transmitting transmit data generated in the utilization portion or fixed data previously retained inside the device to an exterior in accordance with a previously determined protocol, and a memory which is shared between the utilization portion and the control portion, characterized in that the memory comprises a transmission buffer, having a plurality of data write areas for temporarily storing transmit data newly generated in the utilization portion, and a header information write area and an ender information write area which are provided in relation to each of the data write areas, for further managing a state where the transmit data stored in the data write area is transmitted, a fixed data storage portion for storing the fixed data, and a management table for managing a state where each of the fixed data, whose request for transmission from the utilization portion has been accepted by the control portion, is transmitted and the location, on the fixed data storage portion, of the fixed data, the utilization portion outputs, when the transmit data is generated, a request to acquire the data write area in the transmission buffer to the control portion, the control portion refers, when the request for acquisition is issued, to the transmission buffer, to specify the data write area where writing is newly allowed in the transmission buffer and present the delta write area to the utilization portion, the utilization portion writes the transmit data into the data write area, which has been presented from the control portion, in the transmission buffer, the control portion respectively writes header information and ender information into the header information write area and the ender information write area in processes carried out after accepting a request to transmit the transmit data from the utilization portion until the transmission of a packet including the transmit data is started, to complete the transmitting packet in the transmission buffer, and the control portion registers, in a case of accepting the request to transmit the fixed data from the utilization portion, the location, on the fixed data storage portion, of the fixed data in the management table.

As described in the foregoing, according to the third aspect, the fixed data is previously stored. When the fixed data is transmitted, therefore, the fixed data need not be transcribed onto the management table, thereby further simplifying the processing in the utilization portion.

A fourth aspect is directed to a communication device comprising a control portion for processing data received from another communication device through an interface in accordance with a previously determined protocol, a plurality of utilization portions for performing application processing of the data transferred from the control portion, and a memory which is shared between the control portion and the utilization portion, characterized in that the memory comprises a first receiving buffer having one or two or more data write areas for temporarily storing the data received by the control portion, and a plurality of second receiving buffers respectively corresponding to the plurality of utilization portions and each having a plurality of data write areas for further temporarily storing the data written into the first receiving buffer, the control portion confirms, when the data written into the first receiving buffer is utilization portion data whose processing should be performed by the utilization portion, a state where the utilization portion which is the destination of the utilization portion data is used, writes, when the state where the utilization portion is used is a state where it is impossible to accept the utilization portion data, the utilization portion data into the second receiving buffer, and notifies, when the state where the utilization portion is used is a state where it is possible to accept the utilization portion data, the utilization portion of the location and the size of the utilization portion data written into the first receiving buffer, and the utilization portion reads the utilization portion data from the first receiving buffer upon receipt of the notification.

As described in the foregoing, according to the fourth aspect, the utilization portion judges, when the data written into the first receiving buffer is utilization portion data, whether or not the utilization portion which is the destination of the utilization portion data is in a busy state before the utilization portion data is transcribed onto the second receiving buffer. When the utilization portion is not in a busy state, the utilization portion data is directly transcribed onto a utilization portion data transcription area from the first receiving buffer without through the second receiving buffer. Consequently, the number of steps of transcribing the utilization portion data can be reduced, thereby improving communication throughput.

A fifth aspect is characterized in that in the fourth aspect, the locations and the sizes of the plurality of receiving buffers are respectively set by the plurality of utilization portions.

As described in the foregoing, according to the fifth aspect, the setting of the location and the size of the second receiving buffer is submitted to each of the utilization portions. Consequently, each of the utilization portions can set the most suitable size conforming to its own processing capabilities. Therefore, it is possible to effectively utilize restricted resources in the communication device.

A sixth aspect is characterized in that in the fourth aspect, the control portion further comprises means for previously communicating, prior to communicating data, the number of times the data can be continuously received to the other communication device, the control portion finding, every time data communication is established, the number of times the data can be continuously received by calculation from the size of the second receiving buffer and the maximum size of the data which can be transmitted in the established communication.

A seventh aspect is characterized in that in the fifth aspect, the control portion further comprises means for previously communicating, prior to communicating data, the number of times the data can be continuously received to the other communication device, the control portion finding, every time data communication is established, the number of times the data can be continuously received by calculation from the size of the second receiving buffer and the maximum size of the data which can be transmitted in the established communication.

As described in the foregoing, according to the sixth and seventh aspects, in a case where the communication devices in the fourth and fifth aspects comprise means for previously communicating the number of times data can be continuously received to the other communication device prior to communicating the data, every time data communication is established, the number of times the data can be continuously received is found from the size of the second receiving buffer and the maximum size of the data which can be transmitted in the established data, communication. Consequently, it is possible to avoid the overflow of the received data, and establish efficient and most suitable data communication.

An eighth aspect is directed to a communication method used in a communication device comprising a utilization portion for performing arbitrary application processing, a control portion for transmitting transmit data generated in the utilization portion to an exterior in accordance with a previously determined protocol, and a memory which is shared between the utilization portion and the control portion, wherein the memory comprises a transmission buffer having a plurality of data write areas for temporarily storing the transmit data generated in the utilization portion, and a management table for managing a state where each of the transmit data, whose request for transmission from the utilization portion has been accepted by the control portion, is transmitted and the location, on the transmission buffer, of the transmit data, the communication method comprising the step in the utilization portion of outputting, when the transmit data is generated, a request to acquire the data write area in the transmission buffer to the control portion, the step in the control portion of referring, when the request for acquisition is issued, to the transmission buffer, to specify the data write area where writing is newly allowed in the transmission buffer and present the data write area to the utilization portion, the step in the utilization portion of writing the transmit data into the data write area, which has been presented from the control portion, in the transmission buffer, and the step in the control portion of registering, in a case of accepting the request to transmit the transmit data from the utilization portion, the location, on the transmission buffer, of the transmit data in the management table.

As described in the foregoing, according to the eighth aspect, the control portion only issues the request to acquire the write area to the utilization portion, and the transmission buffer is entirely managed by the control portion. Therefore, the amount of data exchanged between the control portion and the utilization portion is made smaller, as compared with that in the conventional communication method, so that a load on the whole communication device using the communication method in the present aspect is reduced. The utilization portion can be devoted to performance of application processing originally expected, thereby improving the speed at which the application processing is performed. Further, an application program for realizing the utilization portion is simplified, thereby making it possible to save time and cost required for its development.

A ninth aspect is directed to a communication method used in a communication device comprising a utilization portion for performing arbitrary application processing, a control portion for transmitting transmit data generated in the utilization portion to an exterior in accordance with a previously determined protocol, and a memory which is shared between the utilization portion and the control portion, wherein the memory comprises a transmission buffer, having a plurality of data write areas for temporarily storing the transmit data generated in the utilization portion, and a header information write area and an ender information write area which are provided in relation to each of the data write areas, for further managing a state where the transmit data stored in the data write area is transmitted, the communication method comprising the step in the utilization portion of outputting, when the transmit data is generated, a request to acquire the data write area in the transmission buffer to the control portion, the step in the control portion of referring, when the request for acquisition is issued, to the transmission buffer, to specify the data write area where writing is newly allowed in the transmission buffer and present the data write area to the utilization portion, the step in the utilization portion of writing the transmit data into the data write area, which has been presented from the control portion, in the transmission buffer, and the step in the control portion of respectively writing header information and ender information into the header information write area and the ender information write area in processes carried out after accepting the request to transmit the transmit data from the utilization portion until the transmission of a packet including the transmit data is started, to complete the transmitting packet in the transmission buffer.

As described in the foregoing, according to the ninth aspect, one transmission buffer is caused to have the respective functions of the transmission buffer and the management table in the eighth aspect. Therefore, it is not necessary to link the data between the transmission buffer and the management table as in the eighth aspect, so that the amount of data stored is reduced (specifically, the location of the transmit data need not be stored). According to the ninth aspect, the transmitting packet is completed in the transmission buffer. Therefore, the transmit data need not be transcribed, thereby simplifying the processing for generating the packet.

A tenth aspect is directed to a communication method used in a communication device comprising a utilization portion for performing arbitrary application processing, a control portion for transmitting transmit data generated in the utilization portion or fixed data previously retained inside the device to an exterior in accordance with a previously determined protocol, and a memory which is shared between the utilization portion and the control portion, wherein the memory comprises a transmission buffer having a plurality of data write areas for temporarily storing transmit data newly generated in the utilization portion, and a header information write area and an ender information write area which are provided in relation to each of the data write areas, for further managing a state where the transmit data stored in the data write area is transmitted, a fixed data storage portion for storing the fixed data, and a management table for managing a state where each of the fixed data, whose request for transmission from the utilization portion has been accepted by the control portion, is transmitted and the location, on the fixed data storage portion, of the fixed data, the communication method comprising the step in the utilization portion of outputting, when the transmit data is generated, a request to acquire the data write area in the transmission buffer to the control portion, the step in the control portion of referring, when the request for acquisition is issued, to the transmission buffer, to specify the data write area where writing is newly allowed in the transmission buffer and present the data write area to the utilization portion, the step in the utilization portion of writing the transmit data into the data write area, which has been presented from the control portion, in the transmission buffer, the step in the control portion of respectively writing header information and ender information into the header information write area and the ender information write area in processes carried out after accepting a request to transmit the transmit data from the utilization portion until the transmission of a packet including the transmit data is started, to complete the transmitting packet in the transmission buffer, and the step in the control portion of registering, in a case of accepting the request to transmit the fixed data from the utilization portion, the location, on the fixed data storage portion, of the fixed data in the management table.

As described in the foregoing, according to the tenth aspect, the fixed data is previously stored. When the fixed data is transmitted, therefore, the fixed data need not be transcribed onto the management table, thereby further simplifying the processing in the utilization portion.

An eleventh aspect is directed to a communication method used in a communication device comprising a control portion for processing data received from another communication device through an interface in accordance with a previously determined protocol, a plurality of utilization portions for performing application processing of the data transferred from the control portion, and a memory which is shared between the control portion and the utilization portion, wherein the memory comprises a first receiving buffer having one or two or more data write areas for temporarily storing the data received by the control portion, and a plurality of second receiving buffers respectively corresponding to the plurality of utilization portions and each having a plurality of data write areas for further temporarily storing the data written into the first receiving buffer, the communication method comprising the step in the control portion of confirming, when the data written into the first receiving buffer is utilization portion data whose processing should be performed by the utilization portion, a state where the utilization portion which is the destination of the utilization portion data is used, the step in the control portion of writing, when the state where the utilization portion is used is a state where it is impossible to accept the utilization portion data, the utilization portion data into the second receiving buffer, the step in the control portions of notifying, when the state where the utilization portion is used is a state where it is possible to accept the utilization portion data, the utilization portion of the location and the size of the utilization portion data written into the first receiving buffer, and the step in the utilization portion of reading the utilization portion data from the first receiving buffer upon receipt of the notification.

As described in the foregoing, according to the eleventh aspect, the utilization portion judges, when the data written into the first receiving buffer is utilization portion data, whether or not the utilization portion which is the destination of the utilization portion data is in a busy state before the utilization portion data is transcribed onto the second receiving buffer. When the utilization portion is not in a busy state, the utilization portion data is directly transcribed onto a utilization portion data transcription area from the first receiving buffer without through the second receiving buffer. Consequently, the number of steps of transcribing the utilization portion data can be reduced, thereby improving communication throughput.

A twelfth aspect is characterized in that in the eleventh aspect, the locations and the sizes of the plurality of second receiving buffers are respectively set by the plurality of utilization portions.

As described in the foregoing, according to the twelfth aspect, the setting of the location and the size of the second receiving buffer in the eleventh aspect is submitted to each of the utilization portions. Consequently, each of the utilization portions can set the most suitable size conforming to its own processing capabilities. Therefore, it is possible to effectively utilize restricted resources in the communication device.

A thirteenth aspect is characterized in that in the eleventh aspect, further comprising the step in the control portion of communicating, prior to communicating data, the number of times the data can be continuously received to the other communication device, the control portion finding, every time data communication is established, the number of times the data can be continuously received by calculation from the size of the second receiving buffer and the maximum size of the data which can be transmitted in the established communication.

A fourteenth aspect is characterized in that in the twelfth aspect, further comprising the step in the control portion of previously communicating, prior to communicating data, the number of times the data can be continuously received to the other communication device, the control portion finding, every time data communication is established, the number of times the data can be continuously received by calculation from the size of the second receiving buffer and the maximum size of the data which can be transmitted in the established communication.

As described in the foregoing, according to the thirteenth and fourteenth aspects, when the communication method in the eleventh and twelfth aspects comprises the step of previously communicating the number of times data can be continuously received to the other communication device prior to communicating the data, the number of times the data can be continuously received is found, every time data communication is established, from the size of the second receiving buffer and the maximum size of the data which can be transmitted in the established data communication. Consequently, it is possible to avoid the overflow of the received data, and establish efficient and most suitable data communication.

A fifteenth aspect is directed to a recording medium on which a computer program, executed in a communication device comprising a utilization portion for performing arbitrary application processing, a control portion for transmitting transmit data generated in the utilization portion to an exterior in accordance with a previously determined protocol, and a memory which is shared between the utilization portion and the control portion, for realizing a predetermined operational environment on the communication device is recorded, wherein the memory comprises a transmission buffer having a plurality of data write areas for temporarily storing the transmit data generated in the utilization portion, and a management table for managing a state where each of the transmit data, whose request for transmission from the utilization portion has been accepted by the control portion, is transmitted and the location, on the transmission buffer, of the transmit data, and the operational environment comprising the step in the utilization portion of outputting, when the transmit data is generated, a request to acquire the data write area in the transmission buffer to the control portion, the step in the control portion of referring, when the request for acquisition is issued, to the transmission buffer, to specify the data write area where writing is newly allowed in the transmission buffer and present the data write area to the utilization portion, the step in the utilization portion of writing the transmit data into the data write area, which has been presented from the control portion, in the transmission buffer, and the step in the control portion of registering, in a case of accepting the request to transmit the transmit data from the utilization portion, the location, on the transmission buffer, of the transmit data in the management table.

A sixteenth aspect is directed to a recording medium on which a computer program, executed in a communication device comprising a utilization portion for performing arbitrary application processing, a control portion for transmitting transmit data generated in the utilization portion to an exterior in accordance with a previously determined protocol, and a memory which is shared between the utilization portion and the control portion, for realizing a predetermined operational environment on the communication device is recorded, wherein the memory comprises a transmission buffer having a plurality of data write areas for temporarily storing the transmit data generated in the utilization portion, and a header information write area and an ender information write area which are provided in relation to each of the data write areas, for further managing a state where the transmit data stored in the data write area is transmitted, and the operational environment comprises the step in the utilization portion of outputting, when the transmit data is generated, a request to acquire the data write area in the transmission buffer to the control portion, the step in the control portion of referring, when the request for acquisition is issued, to the transmission buffer, to specify the data write area where writing is newly allowed in the transmission buffer and present the data write area to the utilization portion, the step in the utilization portion of writing the transmit data into the data write area, which has been presented from the control portion, in the transmission buffer, and the step in the control portion of respectively writing header information and ender information into the header information write area and the ender information write area in processes carried out after accepting a request to transmit the transmit data from the utilization portion until the transmission of a packet including the transmit data is started, to complete the transmitting packet in the transmission buffer.

A seventeenth aspect is directed to a recording medium on which a computer program, executed in a communication device comprising a utilization portion for performing arbitrary application processing, a control portion for transmitting transmit data generated in the utilization portion or fixed data previously retained inside the device to an exterior in accordance with a previously determined protocol, and a memory which is shared between the utilization portion and the control portion, for realizing a predetermined operational environment on the communication device is recorded, wherein the memory comprises a transmission buffer having a plurality of data write areas for temporarily storing transmit data newly generated in the utilization portion, and a header information write area and an ender information write area which are provided in relation to each of the data write areas, for further managing a state where the transmit data stored in the data write area is transmitted, a fixed data storage portion for storing the fixed data, and a management table for managing a state where each of the fixed data, whose request for transmission from the utilization portion has been accepted by the control portion, is transmitted and the location, on the fixed data storage portion, of the fixed data, and the operational environment comprises the step in the utilization portion of outputting, when the transmit data is generated, a request to acquire the data write area in the transmission buffer to the control portion, the step in the control portion of referring, when the request for acquisition is issued, to the transmission buffer, to specify the data write area where writing is newly allowed in the transmission buffer and present the data write area to the utilization portion, the step in the utilization portion of writing the transmit data into the data write area, which has been presented from the control portion, in the transmission buffer, the step in the control portion of respectively writing header information and ender information in the header information write area and the ender information write area in processes carried out after accepting a request to transmit the transmit data from the utilization portion until the transmission of a packet including the transmit data is started, to complete the transmitting packet in the transmission buffer, and the step in the control portion of registering, in a case of accepting the request to transmit the fixed data from the utilization portion, the location, on the fixed data storage portion, of the fixed data in the management table.

An eighteenth aspect is directed to a recording medium on which a computer program, executed in a communication device comprising a control portion for processing data received from another communication device through an interface in accordance with a previously determined protocol, a plurality of utilization portions for performing application processing of the data transferred from the control portion, and a memory which is shared between the control portion and the utilization portion, for realizing a predetermined operational environment on the communication device is recorded, wherein the memory comprises a first receiving buffer having one or two or more data write areas for temporarily storing the data received in the control portion, and a plurality of second receiving buffers respectively corresponding to the plurality of utilization portions and each having a plurality of data write areas for further temporarily storing the data written into the first receiving buffer, and the operational environment comprises the step in the control portion of confirming, when the data written into the first receiving buffer is utilization portion data whose processing should be performed by the utilization portion, a state where the utilization portion which is the destination of the utilization portion data is used, the step in the control portion of writing, when the state where the utilization portion is used is a state where it is impossible to accept the utilization portion data, the utilization portion data into the second receiving buffer, the step in the control portion of notifying, when the state where the utilization portion is used is a state where it is possible to accept the utilization portion data, the utilization portion of the location and the size of the utilization portion data written into the first receiving buffer, and the step in the utilization portion of reading the utilization portion data from the first receiving buffer upon receipt of the notification.

A nineteenth aspect is characterized in that in the eighteenth aspect, the locations and the sizes of the plurality of second receiving buffers are respectively set by the plurality of utilization portions.

A twentieth aspect is characterized in that in the eighteenth aspect, the operational environment further comprises the step in the control portion of previously communicating, prior to communicating data, the number of times the data can be continuously received to the other communication device, the control portion finding, every time data communication is established, the number of times the data can be continuously received by calculation from the size of the second receiving buffer and the maximum size of the data which can be transmitted in the established communication.

A twenty-first aspect is characterized in that in the nineteenth aspect, the operational environment further comprises the step in the control portion of previously communicating, prior to communicating data, the number of times the data can be continuously received to the other communication device, the control portion finding, every time data communication is established, the number of times the data can be continuously received by calculation from the size of the second receiving buffer and the maximum size of the data which can be transmitted in the communication.

As described in the foregoing, the fifteenth to twenty-first aspects are directed to the medium on which the program for realizing the communication methods in the eighth to fourteenth aspects on the communication device is recorded. This corresponds to a case where the communication methods in the eighth to fourteenth aspects are supplied to an arbitrary communication device in the form of software. Consequently, the effects in the fifteenth to twenty-first aspects are the same as the effects in the eighth to fourteenth aspects.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the configuration of a communication device according to a first embodiment of the present invention;

FIG. 2 is a diagram showing the structure of a transmission buffer 34 shown in FIG. 1;

FIG. 3 is a diagram showing the structure of a management table 35 shown in FIG. 1 and a management table 35 shown in FIG. 10;

FIG. 8 is a diagram showing the structure of a transmission buffer 36 shown in FIG. 7 and a transmission buffer 36 shown in FIG. 10;

FIG. 14 is a block diagram showing the configuration of a communication device according to a fourth embodiment of the present invention;

FIGS. 16a and 6b are diagrams showing examples of the structure of data transmitted and received in the communication device in FIG. 14;

FIG. 17 is a flow chart showing a part of operations performed by a control portion 11 shown in FIG. 14;

FIG. 18 is a flow chart showing a part of the operations performed by the control portion 11 shown in FIG. 14;

FIG. 22 is a diagram showing the structure of management tables 101 to 10N shown in FIG. 21;

FIG. 25 is a diagram showing the structure of a transmission buffer 1031 shown in FIG. 24;

FIG. 26 is a diagram showing the structure of a transmit data management table 1032 shown in FIG. 24;

FIG. 27 is a diagram showing the structure of an untransmitted data management table 1033 shown in FIG. 24;

Figure 4:
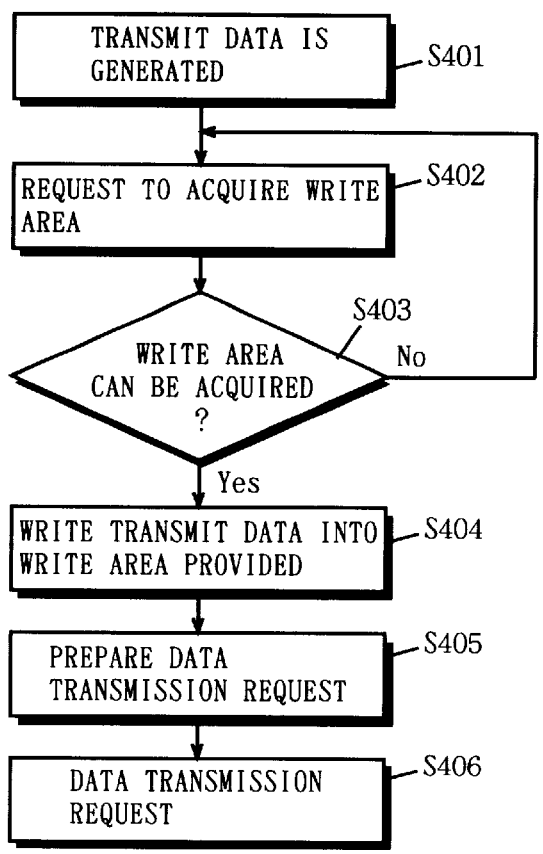
FIG. 4 is a flow chart showing a part of operations performed by a utilization portion 20 shown in FIG. 1.

DESCRIPTION OF THE PREFERRED EMBODIMENTS (First Embodiment)

FIG. 1 is a block diagram showing the configuration of a communication device according to a first embodiment of the present invention. In FIG. 1, the communication device according to the first embodiment comprises a control portion 10, a utilization portion 20, a RAM 30, and an interface 40.

The control portion 10 executes a previously determined communication protocol. Although the utilization portion 20 performs application processing, no service for using is specified on the communication protocol. That is, a user can use an arbitrary application program in the utilization portion 20.

In a typical hardware environment, each of the control portion 10 and the utilization portion 20 is constituted by a storage device (a ROM, a RAM, a hard disk, etc.) storing predetermined program data and a CPU (Central Processing Unit) which executes the program data. In this case, a function exercised by the control portion 10 and a function exercised by the utilization portion 20 are respectively provided in independent forms of program data. Each of the program data may be introduced through a recording medium such as a CD-ROM or a floppy disk, or may be introduced by communication.

The RAM 30 is used as a working memory of the control portion and the utilization portion 20. The RAM 30 has a transmission buffer 34 and a management table 35. Both the transmission buffer 34 and the management table 35 are under the management of the control portion 10. The details of the transmission buffer 34 and the management table 35 will be described later.

The control portion 10 is connected to a communication line 42 through the interface 40. The communication line 42 need not be in a wire form, and may be in a wireless form using radio waves or light as a communication medium. The interface 40 includes a modem or the like, and mediates communication between the communication device shown in FIG. 1 and another communication device (not shown).

FIG. 2 is a diagram showing the structure of the transmission buffer 34 shown in FIG. 1. Transmit data generated in the utilization portion 20 is written into the transmission buffer 34. In FIG. 2, eight transmit data are written, as an example, into the transmission buffer 34. The transmission buffer 34 is provided with a use state flag for a write area of each of the transmit data.

FIG. 3 is a diagram showing the structure of the management table 35 shown in FIG. 1. The management table 35 is similar to the untransmitted data management table 1033 shown in FIG. 27, and stores the location of each of the transmit data whose request for transmission has been accepted (a head address in a write area of the transmit data in the transmission buffer 34) and the size thereof. Further, a header information write area and an ender information write area are provided in relation to the location and the size of each of the transmit data.

Figure 5:
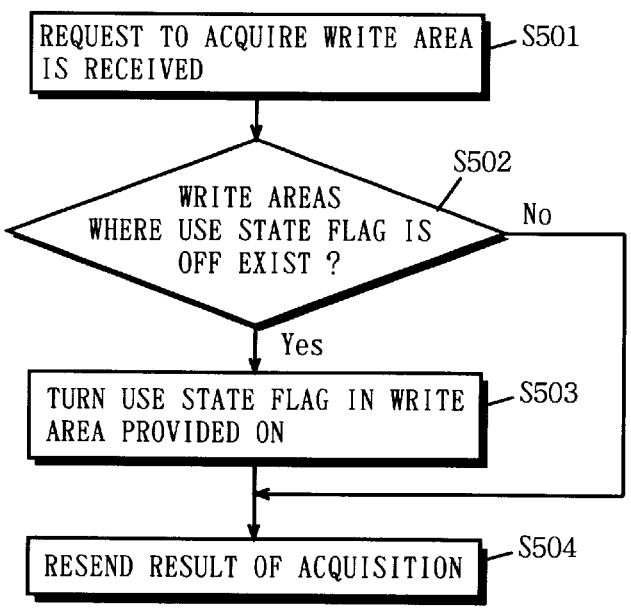
FIG. 5 is a flow chart showing a part of operations performed by a control portion 10 shown in FIG. 1.
Figure 6:
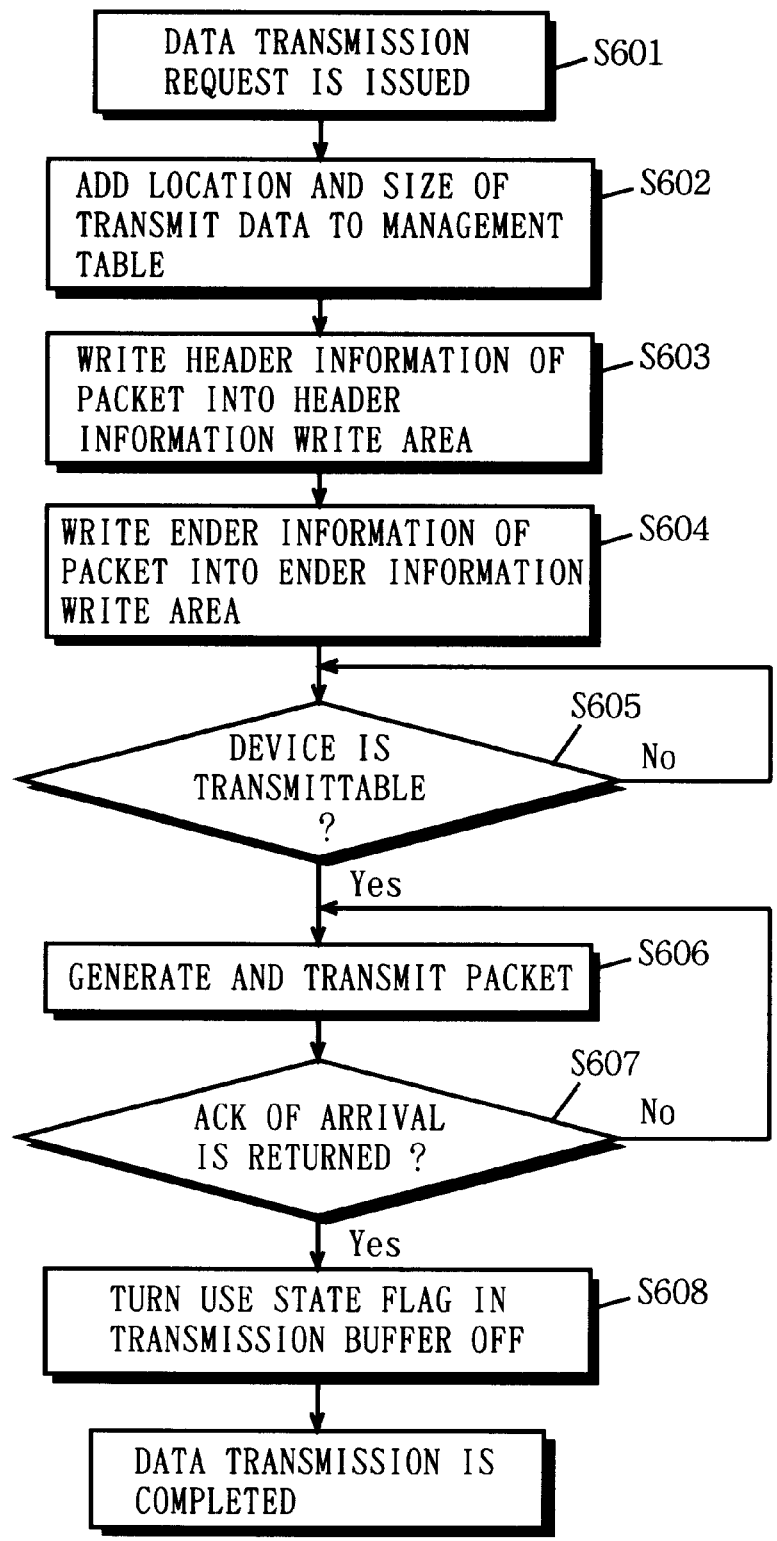
FIG. 6 is a flow chart showing a part of the operations performed by the control portion 10 shown in FIG. 1.

FIG. 4 is a flow chart showing a part of operations performed by the utilization portion 20 shown in FIG. 1. FIGS. 5 and 6 are flow charts showing parts of operations performed by the control portion 10 shown in FIG. 1. Referring now to FIGS. 4 to 6, description is made of a series of operations performed from the time when transmit data is generated until it is transmitted in the communication device shown in FIG. 1.

FIG. 4 will be referred to. The utilization portion 20 outputs, when transmit data is generated (step 401), a request to acquire a write area to the control portion 10 (step 402).

FIG. 5 will be referred to. When the request to acquire the write area is received from the utilization portion 20 (step S501), the control portion 10 judges whether or not write areas where a use state flag is OFF exist in the transmission buffer 34 (step S502). When there exist the write areas where the use state flag is OFF, the control portion 10 determines any one of the write areas as a write area to be provided for the utilization portion 20 in order that new transmit data is to be written thereinto, and turns the use state flag relating thereto on (step S503). Thereafter, the control portion 10 resends the result of the acquisition of the write area (including the success of the acquisition and the location of the write area to be provided) to the utilization portion 20 (step S504). On the other hand, when there exist no write areas where the use state flag is OFF, the control portion 10 resends to the utilization portion 20 the fact that no write area can be acquired (step S504).

FIG. 4 will be referred to again. The utilization portion 20 judges whether or not the write area into which the generated transmit data is to be written has been acquired (step S403). When no write area can be acquired, the utilization portion 20 continues to send a request to acquire a write area to the control portion 10 until the write area can be acquired. On the other hand, when the write area can be acquired, the utilization portion 20 writes transmit data into the write area, in the transmission buffer 34, provided from the control portion 10 (step S404). The utilization portion 20 then prepares a data transmission request (step S405). The data transmission request includes the location of transmit data newly written into the transmission buffer 34 and the size thereof. The data transmission request is outputted to the control portion 10 at the step S406.

FIG. 6 will be referred to. The control portion 10 adds, when it receives the data transmission request from the utilization portion 20 (step S601), the location and the size of transmit data (both are included in the data transmission request) to the management table 35 (step S602). The control portion 10 then writes header information of a packet to be later generated in a header information write area existing in the same column as a column to which the location and the size of the transmit data are added at the step S602 (step S603). Further, the control portion 10 writes ender information of the packet to be later generated in an ender information write area existing in the same column (step S604).

The control portion 10 then judges whether or not the communication device is currently in a transmittable state (step S605). Such judgment is required because the communication device shown in FIG. 1 makes half-duplex transmission, for example, so that it cannot, in some cases, transmit the transmit data while receiving transmit data from a communication device at the destination of communication (not shown), similarly to the conventional communication device. The control portion 10 performs processing at the step S606 immediately when transmission is possible, while performing the processing after waiting, when transmission is impossible, until there occurs a state where transmission is possible. At the step S606, the control portion 10 generates a packet for the oldest transmit data out of transmit data, which have not been transmitted yet, registered in the management table 35, and transmits the packet to the communication device at the destination of communication. The packet is constituted by header information, transmit data, and ender information. The header information and the ender information are taken out of the management table 35. The transmit data is taken out of the transmission buffer 34 (more specifically, out of a write area specified by the location of the transmit data stored in the management table 35).

The control portion 10 then judges whether or not acknowledgment (ACK) of arrival of the transmit data is returned from the communication device at the destination of communication (step S607). When the ACK is not returned, the program is returned to the step S606. At the step S606, the control portion 10 generates and resends the same packet. On the other hand, when the ACK is returned, the control portion 10 judges that the transmission of the packet is terminated, to turn a use state flag in a corresponding write area in the transmission buffer 34 (a write area in which transmit data which has been transmitted at that time is stored) off (step S608). The transmission processing in the control portion 10 is thus terminated.

As described in the foregoing, in the communication device according to the first embodiment of the present invention, the utilization portion 20 only issues a request to acquire a write area to the control portion 10, and the transmission buffer 34 is entirely managed by the control portion 10. Therefore, the amount of data exchanged between the utilization portion 20 and the control portion 10 can be made smaller, as compared with that in the conventional communication device, so that a load on the whole communication device is reduced. The utilization portion 20 can be devoted to performance of application processing originally expected, thereby improving the speed at which the application processing is performed. Further, an application program for realizing the utilization portion 20 is simplified, thereby making it possible to save time and cost required for its development.

(Second Embodiment)

Figure 7:
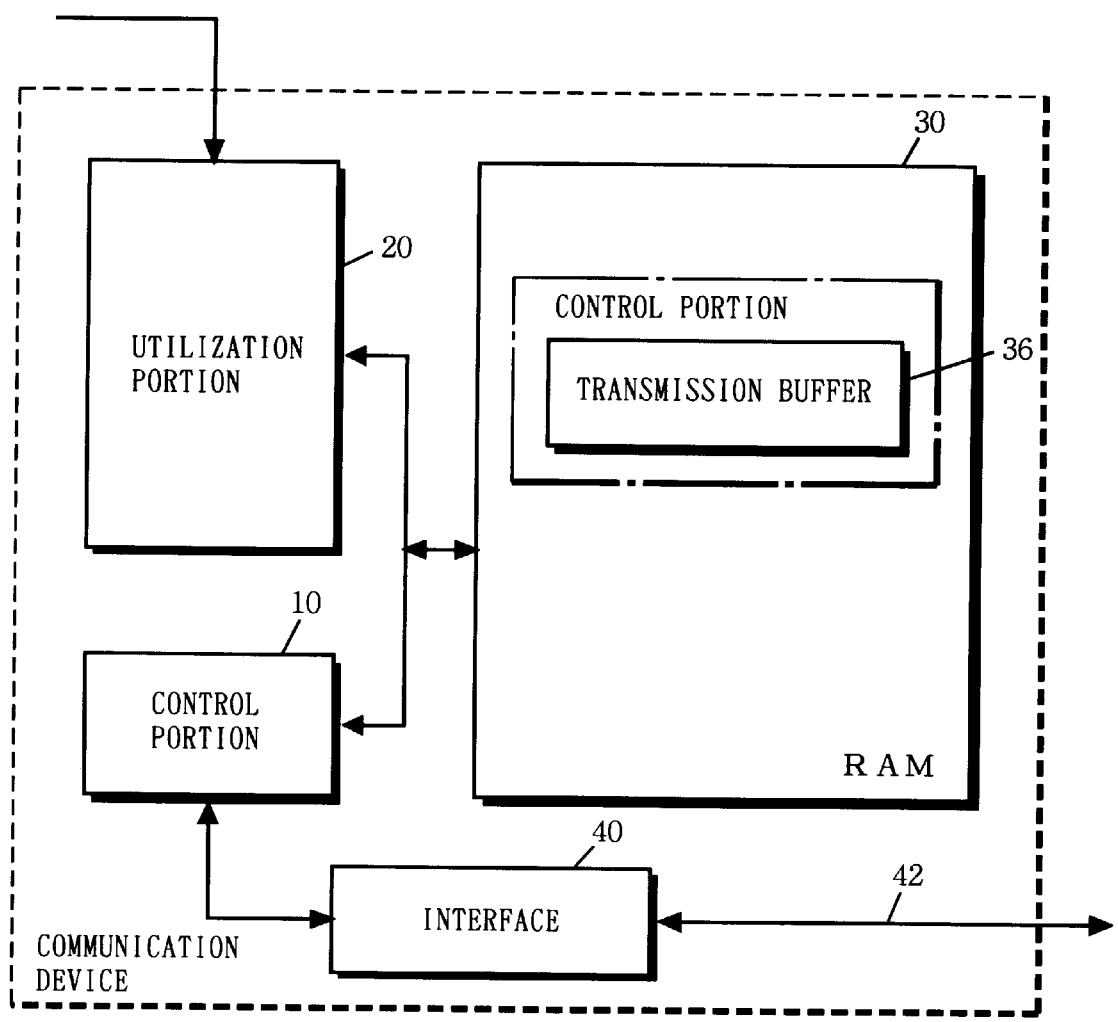
FIG. 7 is a block diagram showing the configuration of a communication device according to a second embodiment of the present invention.

FIG. 7 is a block diagram showing the configuration of a communication device according to a second embodiment of the present invention. In FIG. 7, the communication device according to the second embodiment comprises a control portion 10, a utilization portion 20, a RAM 30, and an interface 40, as in the above-mentioned first embodiment.

The RAM 30 has only a transmission buffer 36 in place of the transmission buffer 34 and the management table 35 shown in FIG. 1. The transmission buffer 36 is under the management of the control portion 10. The other configuration of the communication device according to the second embodiment is the same as that in the communication device according to the first embodiment.

FIG. 8 is a diagram showing the structure of the transmission buffer 36. As shown in FIG. 8, the transmission buffer 36 has both the functions of the transmission buffer 34 and the management table 35 shown in FIG. 1. A use state flag, the size of transmit data, a header information write area, a write area of transmit data, and an ender information write area are prepared with respect to one transmit data. The transmission buffer 36 can store information corresponding to a plurality of transmit data (information corresponding to eight transmit data, as an example, in FIG. 8).

In the second embodiment having the above-mentioned configuration, the control portion 10 shown in FIG. 7 performs operations shown in FIG. 5, similarly to the control portion 10 in the first embodiment. The utilization portion 20 shown in FIG. 7 performs the same operations as the utilization portion 20 in the first embodiment.

Figure 9:
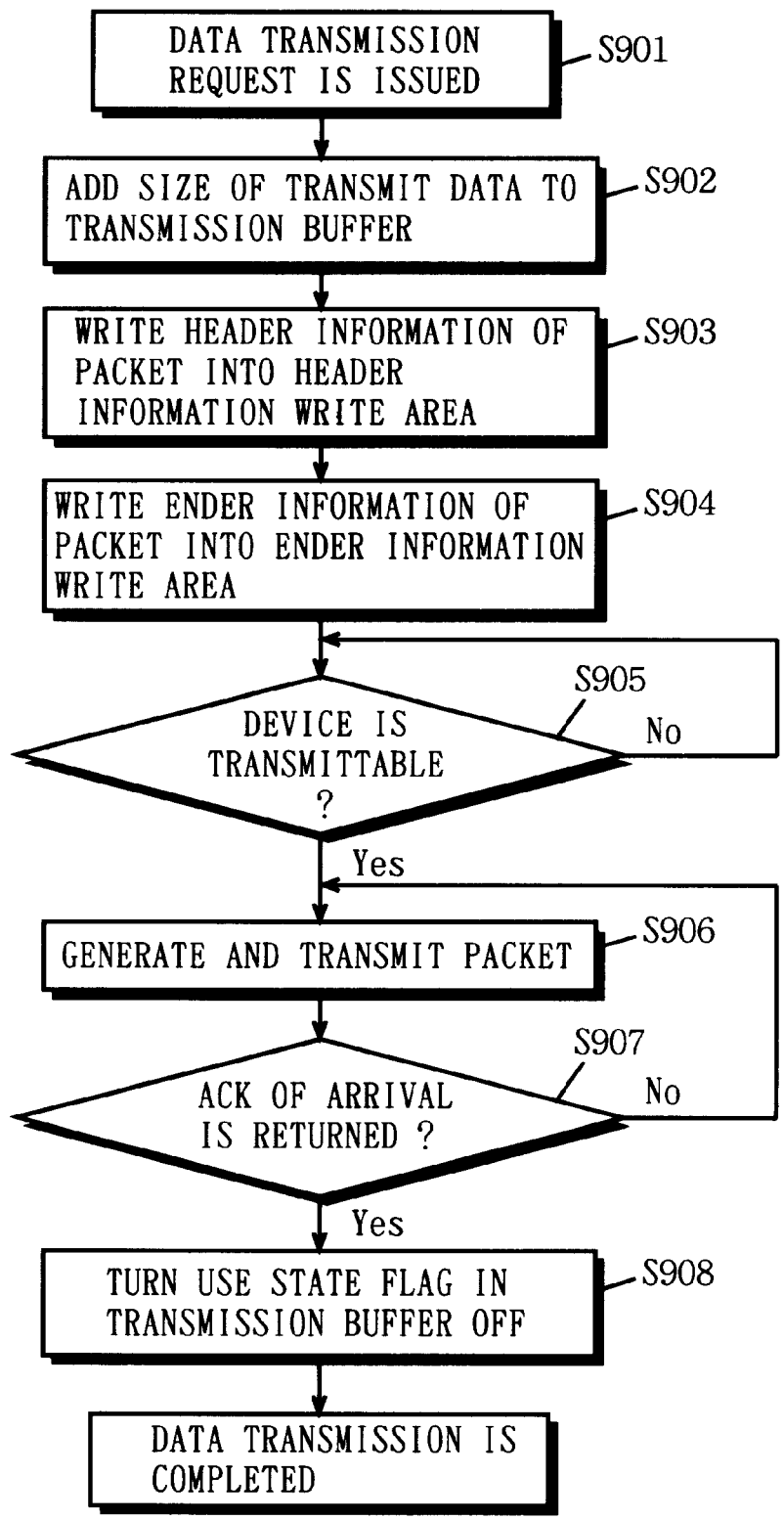
FIG. 9 is a flow chart showing a part of operations performed by a control portion 10 shown in FIG. 7.

FIG. 9 is a flow chart showing transmission processing which the control portion 10 shown in FIG. 7 performs in response to a data transmission request from the utilization portion 20. In the control portion 10 shown in FIG. 7, the operations shown in the flow chart of FIG. 9 differ from the operations performed by the control portion 10 in the first embodiment. Referring now to FIG. 9, in the control portion 10 shown in FIG. 7, the operations different from the operations performed by the control portion 10 in the first embodiment will be described.

Suppose the provision of a write area of transmit data in the transmission buffer 36 for the utilization portion 20 by the control portion 10 is completed, and new transmit data is written into the write area. In this state, when the utilization portion 20 issues a data transmission request to the control portion 10, the control portion 10 receives the data transmission request from the utilization portion 20 (step S901), and adds the size of the transmit data (included in the data transmission request from the utilization portion 20) to the transmission buffer 36 (step S902), as shown in FIG. 9. The control portion 10 then writes header information of a packet to be later generated in a header information write area existing in the same column as a column to which the size of the transmit data is added at the step S902 (step S903). Further, the control portion 10 writes ender information of the packet to be later generated in an ender information write area in the same column (step S904).

The control portion 10 then judges whether or not the communication device is currently in a transmittable state (step S905). The reason for this was described earlier and hence, is not repeated. The control portion 10 generates a packet for the oldest transmit data out of transmit data, which have not been transmitted yet, registered in the transmission buffer 36, and transmits the packet to a communication device at the destination of communication immediately when transmission is possible, while performing the processing after waiting, when transmission is impossible, until there occurs a state where transmission is possible (step S906). As described above, the packet is constituted by header information, transmit data, and ender information. In the second embodiment, the header information, the transmit data, and the ender information are taken out of the transmission buffer 36. Consequently, the packet is generated more simply, as compared with that in the first embodiment.

The control portion 10 then judges whether or not ACK of the transmit data is returned from the communication device at the destination of communication (step S907). When the ACK is not returned, the program is returned to the step S906. At the step S906, the control portion 10 generates and resends the same packet. On the other hand, when the ACK is returned, the control portion 10 judges that the transmission of the packet is terminated, to turn a use state flag in a corresponding write area in the transmission buffer 36 (a write area in which transmit data which has been transmitted at that time is stored) off (step S908). The transmission processing in the control portion 10 is thus terminated.

As described in the foregoing, in the communication device according to the second embodiment of the present invention, the transmission buffer and the management table which are managed by the control portion 10 are collected, thereby eliminating the necessity of linking the data between the transmission buffer and the management table as in the first embodiment, so that the amount of data to be stored is reduced (specifically, the location of transmit data need not be stored). In the communication device according to the second embodiment of the present invention, the packet can be generated only by reading the transmission buffer, thereby simplifying the packet generation processing.

(Third Embodiment)

Figure 10:
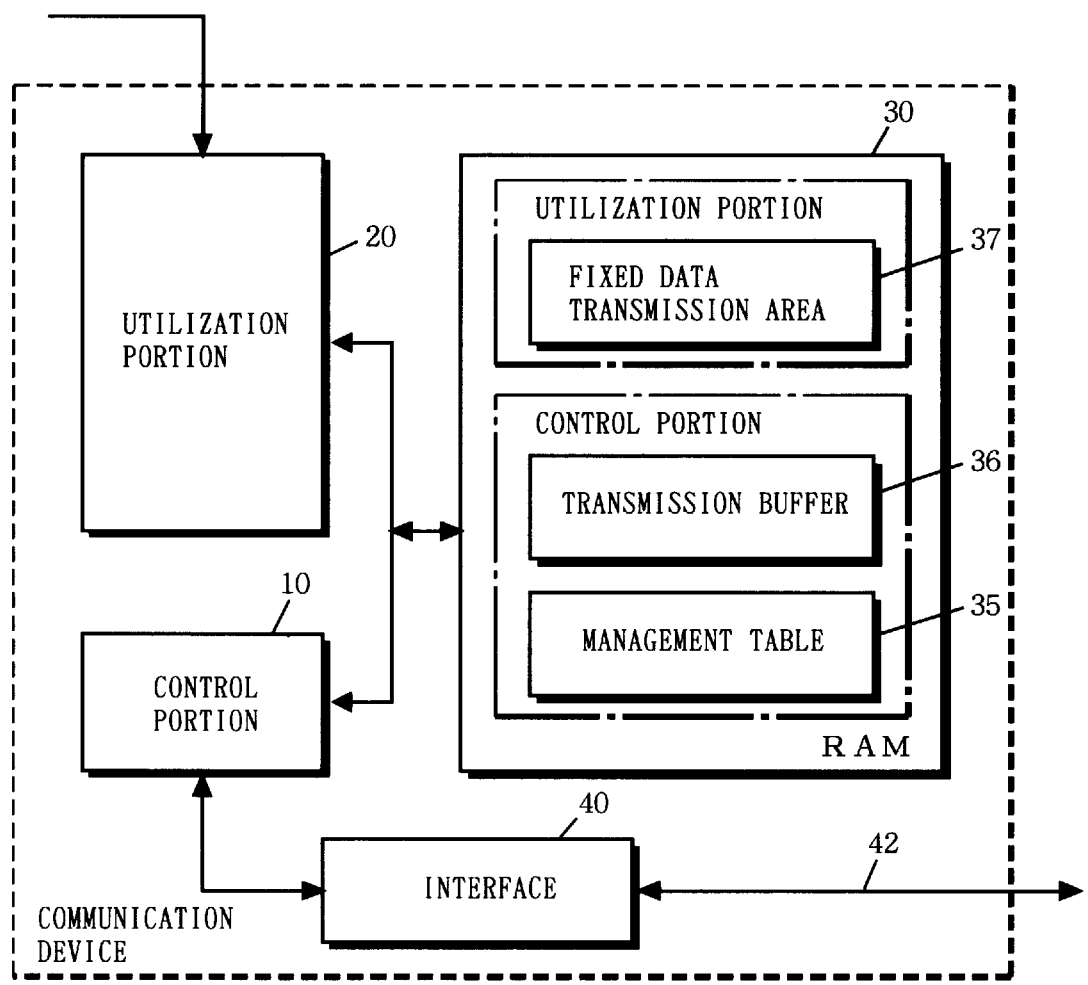
FIG. 10 is a block diagram showing the configuration of a communication device according to a third embodiment of the present invention.

FIG. 10 is a block diagram showing the configuration of a communication device according to a third embodiment of the present invention. In FIG. 10, the communication device according to the third embodiment comprises a control portion 10, a utilization portion 20, a RAM 30, and an interface 40, as in the above-mentioned first embodiment.

The RAM 30 has a fixed data transmission area 37, a transmission buffer 36, and a management table 35. The fixed data transmission area 37 is under the management of the utilization portion 20. Both the transmission buffer 36 and the management table 35 are under the management of the control portion 10. The structure of the transmission buffer 36 is the same as that of the buffer shown in FIG. 8, and the structure of the management table 35 is the same as that of the table shown in FIG. 3.

Figure 11:
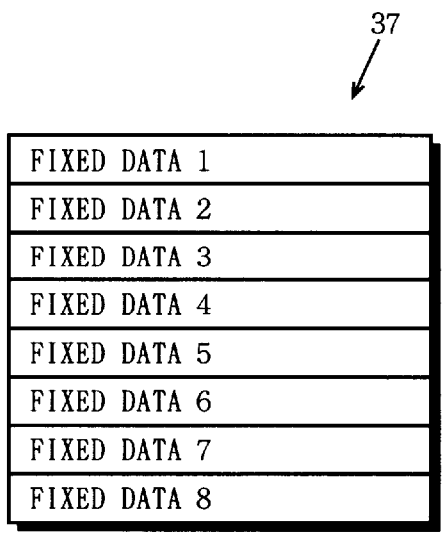
FIG. 11 is a diagram showing the structure of a fixed data transmission area 37 shown in FIG. 10.

FIG. 11 is a diagram showing the structure of the fixed data transmission area 37 shown in FIG. 10. The fixed data transmission area 37 stores one or more fixed data, as illustrated. Fixed data is data, whose contents are fixedly determined, transmitted to a communication device at the destination of communication. This data corresponds to predetermined bit pattern data periodically sent in order to perform synchronization processing in the communication device at the destination of communication, for example.

Figure 12:
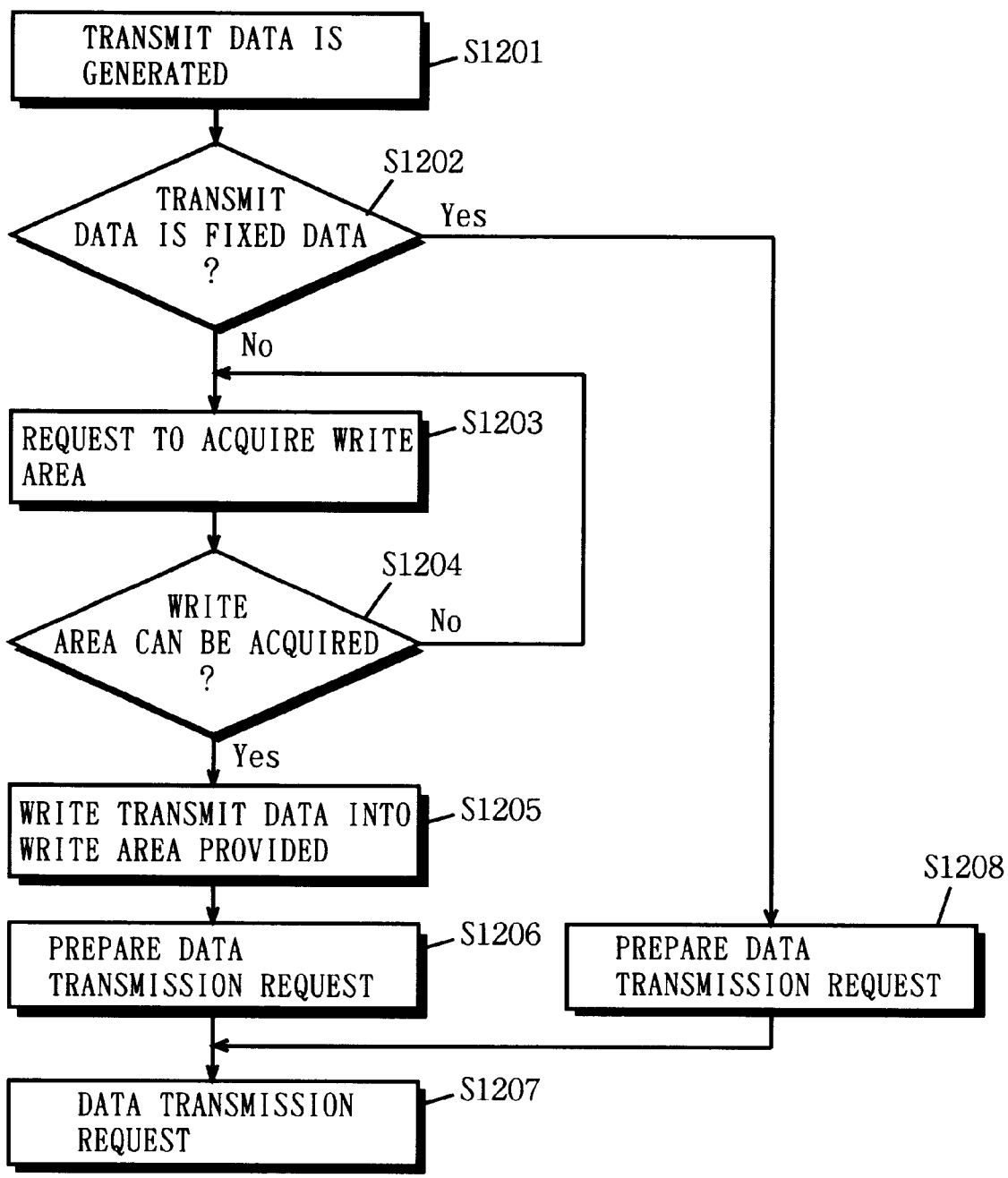
FIG. 12 is a flow chart showing a part of operations performed by a utilization portion 20 shown in FIG. 10.
Figure 13:
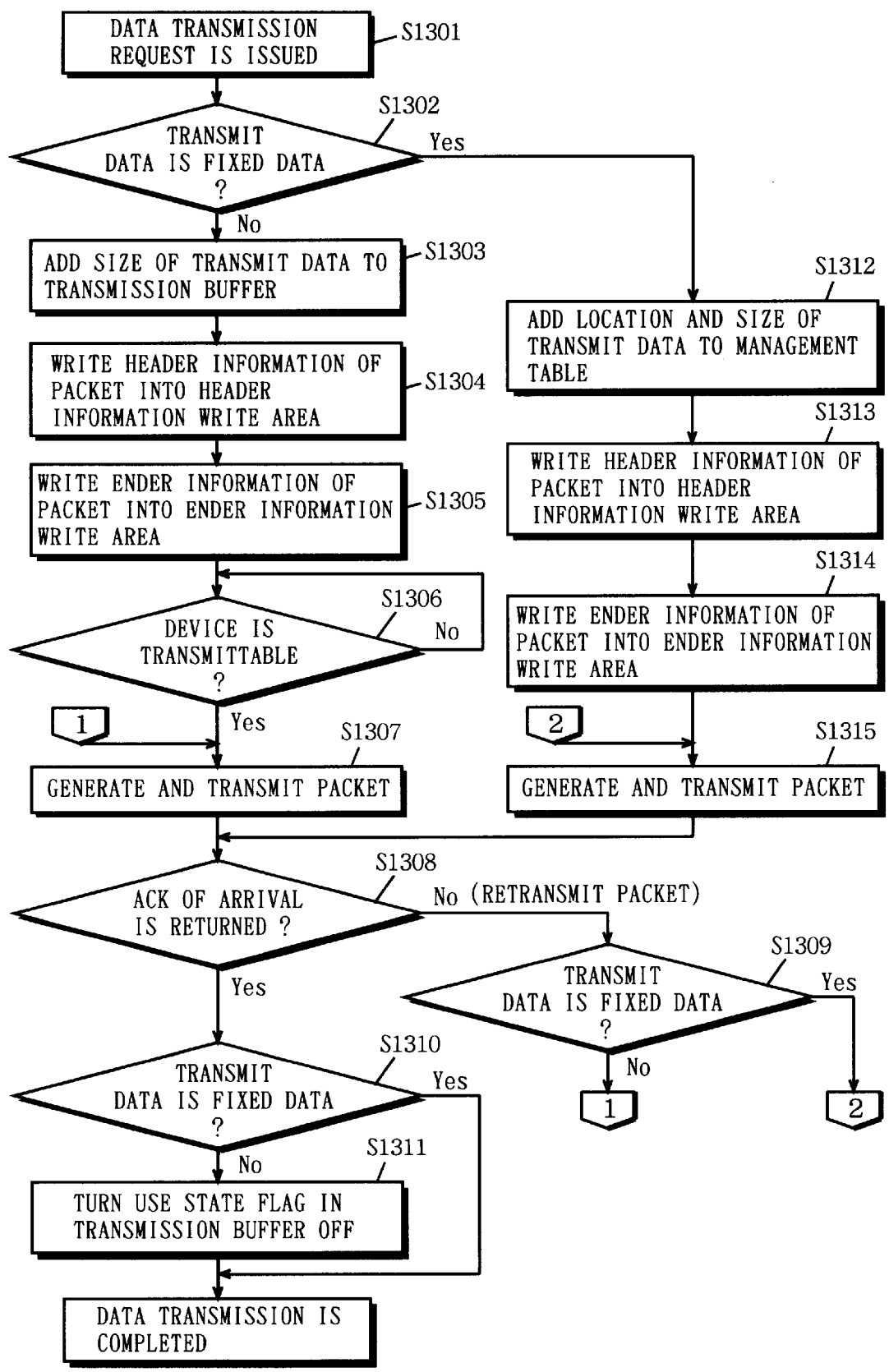
FIG. 13 is a flow chart showing a part of operations performed by a control portion 10 shown in FIG. 10.

FIG. 12 is a flow chart showing a part of operations performed by the utilization portion 20 shown in FIG. 10. FIG. 13 is a flow chart showing a part of operations performed by the control portion 10 shown in FIG. 10. Referring now to FIGS. 12 and 13, description is made of a series of operations performed from the time when transmit data is generated until it is transmitted in the communication device shown in FIG. 10.

FIG. 12 will be referred to. The utilization portion 20 judges, when transmit data is generated (step S1201), whether or not the transmit data is fixed data (step S1202). Operations in a case where the transmit data is data other than fixed data (that is, data newly generated in the utilization portion 20) will be described below. The operations in this case are approximately the same as the operations in the above-mentioned first embodiment.

When the transmit data is data other than fixed data, the utilization portion 20 outputs a request to acquire a write area to the control portion 10 (step S1203). The control portion 10 performs the same operations as those shown in FIG. 5 in response to the request to acquire a write area. That is, the control portion 10 judges whether or not write areas where a use state flag is OFF exist in the transmission buffer 36. When there exist the write areas where the use state flag is OFF, the control portion 10 determines any one of the write areas as a write area to be provided for the utilization portion 20 in order that new transmit data is to be written thereinto, and turns the use state flag relating thereto on. Thereafter, the control portion 10 resends the result of the acquisition of the write area (including the success of the acquisition and the location of the write area to be provided) to the utilization portion 20. On the other hand, when there exists no write area where the use state flag is OFF, the control portion 10 resends to the utilization portion 20 the fact that no write area can be acquired.

The utilization portion 20 which has received the result of the acquisition of the write area from the control portion 10 judges whether or not a write area into which generated transmit data is to be written can be acquired (step S1204). When no write area can be acquired, the utilization portion 20 continues to send a request to acquire a write area to the control portion 10 until a write area can be acquired. On the other hand, when a write area can be acquired, the utilization portion 20 writes transmit data into the write area, in the transmission buffer 36, provided from the control portion 10 (step S1205). The utilization portion 20 then prepares a data transmission request (step S1206). The data transmission request includes the location of transmit data newly written into the transmission buffer 36 and the size thereof. The data transmission request is outputted to the control portion 10 at the step S1207.

FIG. 13 will be referred to. The control portion 10 judges, when it receives the data transmission request from the utilization portion 20 (step S1301), whether or not transmit data is fixed data (step S1302). In this case, the transmit data is data other than fixed data, so that the program proceeds to the step S1303. At the step S1303, the control portion 10 adds the size of the transmit data (included in the data transmission request from the utilization portion 20) to the transmission buffer 36. The control portion 10 then writes header information of a packet to be later generated in a header information write area existing in the same column as a column where the size of the transmit data is added at the step S1302 (step S1304). Further, the control portion 10 writes ender information of the packet to be later generated in an ender information write area existing in the same column (step S1305).

The control portion 10 then judges whether or not the communication device is currently in a transmittable state (step S1306). The reason for this was described earlier and hence, is not repeated. The control portion 10 generates a packet for the oldest transmit data out of transmit data, which have not been transmitted yet, registered in the transmission buffer 36, and transmits the packet to a communication device at the destination of communication immediately when transmission is possible, while performing the processing after waiting, when transmission is impossible, until there occurs a state where transmission is possible (step S1307). As described above, the packet is constituted by header information, transmit data, and ender information. In the third embodiment, the header information, the transmit data, and the ender information are taken out of the transmission buffer 36. Consequently, the packet is generated more simply, as compared with that in the first embodiment, as in the second embodiment.

The control portion 10 then judges whether or not ACK of the transmit data is returned from the communication device at the destination of communication (step S1308). When the ACK is not returned, the control portion 10 judges whether or not the transmit data is fixed data (step S1309). In this case, the transmit data is data other than fixed data, the program is returned to the step S1307. At the step S1307, the control portion 10 generates and resends the same packet. On the other hand, when the ACK is returned, the control portion 10 judges that the transmit data is data other than fixed data (step S1310), and then turns a use state flag in a corresponding write area in the transmission buffer 36 (a write area in which transmit data which has been transmitted at that time is stored) off (step S1311). The transmission processing in the control portion 10 is thus terminated.

Description is now made of operations in a case where transmit data is fixed data. FIG. 12 will be referred to. When the transmit data is fixed data, the utilization portion 20 prepares a data transmission request (step S1208). The data transmission request includes the location of fixed data in the fixed data transmission area 37 and the size thereof. The data transmission request is outputted to the control portion 10 at the step S1207.

FIG. 13 will be referred to. The control portion 10 judges, when it receives the data transmission request from the utilization portion 20 (step S1301), whether or not the transmit data is fixed data (step S1302), and then adds the location and the size of the transmit data (both are included in the data transmission request from the utilization portion 20) to the management table 35 (step S1312). The control portion 10 then writes header information of a packet to be later generated in a header information write area existing in the same column as a column where the location and the size of the transmit data are added at the step S1303 (step S1313). Further, the control portion 10 writes ender information of the packet to be later generated in an ender information write area in the same column (step S1314). The control portion 10 then generates a packet for the oldest transmit data out of transmit data, which have not been transmitted yet, registered in the management table 35, and transmits the packet to the communication device at the destination of communication (step S1315). The packet is constituted by header information, transmit data, and ender information. The header information and the ender information are taken out of the management table 35. The transmit data is taken out of the fixed data transmission area 37 (more specifically, from a fixed data area specified by the location of the transmit data stored in the management table 35).

The control portion 10 then judges whether or not ACK of the transmit data is returned from the communication device at the destination of communication (step S1308). When the ACK is not returned, the control portion 10 judges whether or not the transmit data is fixed data (step S1309). In this case, the transmit data is fixed data, so that the program is returned to the step S1315. At the step S1315, the control portion 10 generates and resends the same packet. On the other hand, when the ACK is returned, the control portion 10 judges that the transmit data is fixed data (step S1310), after which the transmission processing is terminated.

As described in the foregoing, in the communication device according to the third embodiment, the fixed data is previously stored. When the fixed data is transmitted, therefore, the transmit data need not be written into the management table, thereby further simplifying the processing in the utilization portion 20.

(Fourth Embodiment)

FIG. 14 is a block diagram showing the configuration of a communication device according to a fourth embodiment of the present invention. In FIG. 14, the communication device according to the fourth embodiment comprises a control portion 11, a plurality of utilization portions 21 to 2N, a RAM 30, and an interface 40.

The control portion 11 executes a previously determined communication protocol. The control portion 11 is connected to a communication line 42 through the interface 40. The communication line 42 need not be in a wire shape, and may be in a wireless shape using radio waves or light as a communication medium. The interface 40 includes a modem or the like, and mediates communication between the communication device shown in FIG. 14 and another communication device (not shown).

Although the utilization portions 21 to 2N perform application processing, no service for using is specified on the communication protocol. That is, a user can use an arbitrary application program in the utilization portions 21 to 2N.

Figure 15A:
FIGS. 15a and 15b are diagrams showing the structures of a first receiving buffer 81 and second receiving buffers 61 to 6N in FIG. 14, respectively.
Figure 15B:
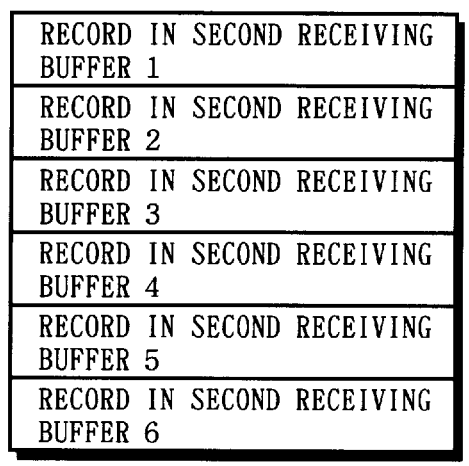

The RAM 30 is used as a working memory of the control portion 11 and the utilization portions 21 to 2N, and comprises a control portion management area 51 which is managed by the control portion 11 and utilization portion management areas 91 to 9N which are respectively managed by the utilization portions 21 to 2N. Further, the control portion management area 51 comprises a first receiving buffer 81, second receiving buffers 61 to 6N respectively corresponding to the utilization portions 21 to 2N, and busy flags 71 to 7N. The first receiving buffer 81 has one record area set by the control portion 11 (FIG. 15a), and data received under an instruction from the control portion 11 is recorded on the one record area. Each of the second receiving buffers 61 to 6N has a plurality of record areas set in the same size by the control portion 11 (FIG. 15b), and the received data recorded on the first receiving buffer 81 is transcribed onto the plurality of record areas by the control portion 11, as required. Suppose the busy flags 71 to 7N can indicate a frequent/infrequent state of data processing in the utilization portions 21 to 2N to the control portion 11 by a method of turning a flag on/off, for example. The utilization portion management areas 91 to 9N include data transcription areas 91a to 9Na, respectively. The utilization portions 21 to 2N respectively transcribe corresponding utilization portion data onto the data transcription areas 91a to 9Na in accordance with notification from the control portion 11 described later.

In a typical hardware environment, each of the control portion 11 and the utilization portions 21 to 2N is constituted by a storage device (a ROM, a RAM, a hard disk, etc.) storing predetermined program data and a CPU (Central Processing Unit) which executes the program data. In this case, a function exercised by the control portion 11 and a function exercised by the utilization portions 21 to 2N are respectively provided in independent forms of program data. Each of the program data may be introduced through a recording medium such as a CD-ROM or a floppy disk, or may be introduced by communication.

Description is now made of the structure of data transmitted and received in the communication device shown in FIG. 14.

Figure 16A:
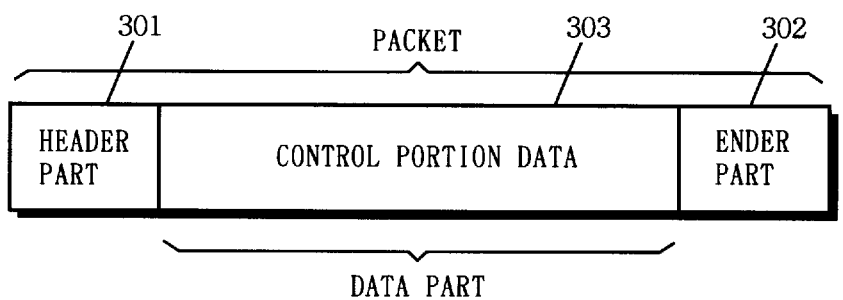
Figure 16B:
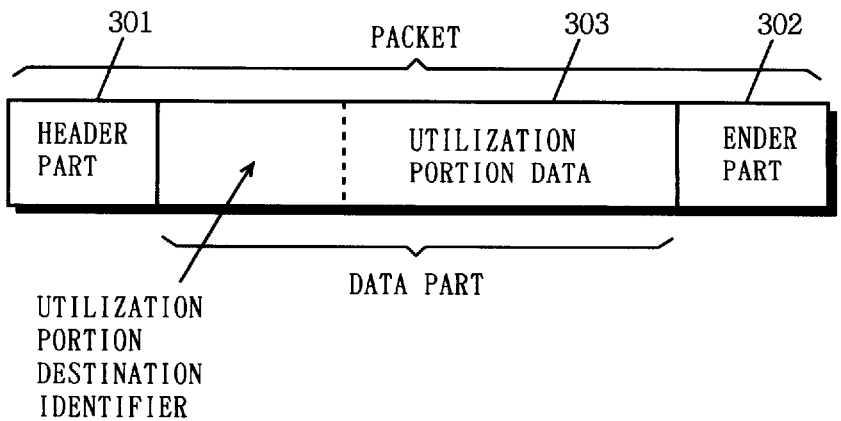

FIGS. 16a and 16b are diagrams showing an example of the structure of data transmitted and received by the communication device shown in FIG. 14. In FIG. 16, data transmitted and received takes the form of a packet. The packet is constituted by a header part composed of a packet head identifier, a communication device identifier, and so forth, a data part 303 which is the principal contents of transmission, and an ender part 302 composed of frame check information, a packet end identifier, and so forth. Examples of data transmitted using the data part 303 include control portion data which is subjected to protocol processing in the control portion 11 and utilization portion data which is subjected to application processing in the utilization portions 21 to 2N. In the case of the utilization portion data, accompanied is a utilization portion destination identifier indicating which of utilization portions is the destination of the data (FIG. 16b).

Figure 19:
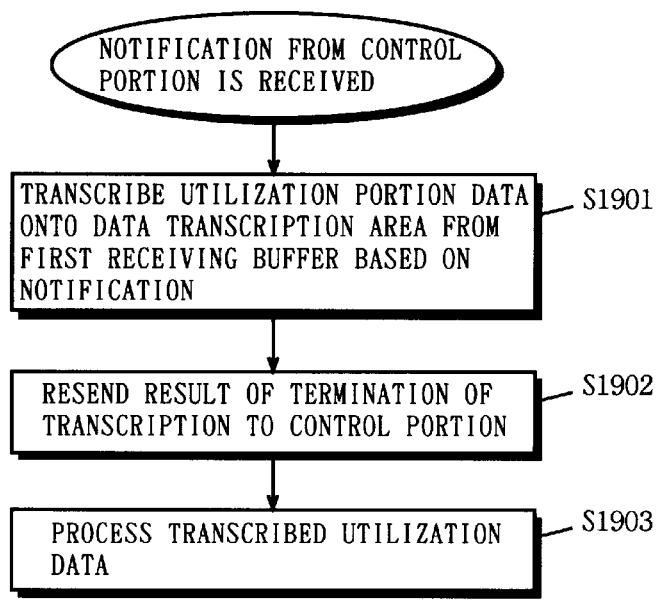
FIG. 19 is a flow chart showing a part of operations performed by a utilization portion 20 shown in FIG. 14.

Referring now to FIGS. 17 to 19, description is made of a series of operations performed from the time when data is received until application processing is performed in the communication device shown in FIG. 14.

FIG. 17 is a flow chart showing processing steps carried out when the control portion 11 shown in FIG. 14 receives data. FIG. 18 is a flow chart showing processing steps carried out by the control portion 11 when busy communication from each of the utilization portions 21 to 2N occurs. FIG. 19 is a flow chart showing processing steps in which each of the utilization portions 21 to 2N shown in FIG. 14 transcribes data.

Figure 20:
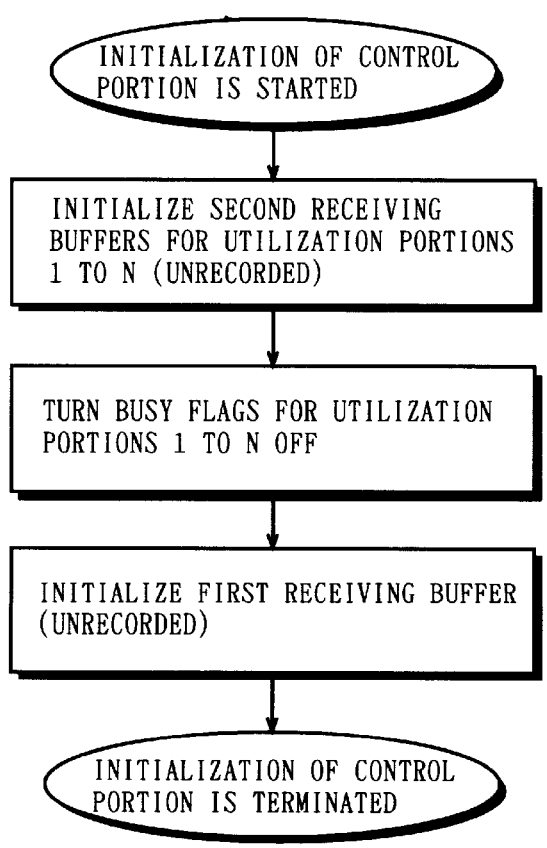
FIG. 20 is a flow chart showing a part of the operations performed by the control portion 11 shown in FIG. 14.

FIG. 17 will be referred to. The control portion 11 writes, when data is received, the received data (actually, the data part 303 of the received packet) into the first receiving buffer 81 (step S1701). As the premise of the start of processing, the first receiving buffer 81, the second receiving buffers 61 to 6N, and busy flags 71 to 7N are initialized by the control portion 11, as shown in FIG. 20. The initialization may be carried out before data is first written into each of the buffers and the flags, for example, when the power of the communication device is turned On.

The control portion 11 then judges whether or not the data part 303 written into the first receiving buffer 81 is utilization portion data (step S1702). In the judgment at the step S1702, when the data part 303 is not utilization portion data, that is, control portion data, the control portion 11 itself subjects the control portion data to protocol processing (step S1708), and then deletes the control portion data from the first receiving buffer 81 (step S1709). On the other hand, in the judgment at the step S1702, when the data part 303 is utilization portion data, the control portion 11 judges whether or not the busy flag 7i for the utilization portion 2i (i=any one of 1 to N. The same shall apply to i hereinafter in the present specification) which is the destination of the utilization portion data is ON on the basis of the utilization portion destination identifier (see FIG. 16b) (step S1703).

In the judgment at the step S1703, when the busy flag 7i is ON, the control portion 11 transcribes the utilization portion data written into the first receiving buffer 81 onto the second receiving buffer 6i (step S1704), and then deletes the utilization portion data from the first receiving buffer 81. On the other hand, in the judgment at the step S1703, when the busy flag 7i is OFF, the control portion 11 notifies, of the location and the size of the utilization portion data written into the first receiving buffer 81, the utilization portion 2i which is the destination of the utilization portion data (step S1706).

FIG. 19 will be referred to. The utilization portion 2i transcribes, when it receives the above-mentioned notification from the control portion 11, the utilization portion data onto the data transcription area 9ia managed by itself from the first receiving buffer 81 on the basis of the notification (step S1901). When the transcription of the data is terminated, the utilization portion 2i resends the result of the termination of the transcription to the control portion 11 (step S1902). Thereafter, the utilization portion 2i processes the utilization portion data transcribed onto the data transcription area 9ia managed by itself (step S1903).

FIG. 17 will be referred to again. The control portion 11 deletes the utilization portion data, of which the utilization portion 2i has been notified, from the first receiving buffer 81 upon receipt of the result from the utilization portion 2i (step S1707).

Processing subsequent to the transcription of the utilization portion data onto the second receiving buffer 6i in the processing at the step S1704 will be described with reference to FIG. 18. As shown in FIG. 18, the control portion 11 processes the utilization portion data written into the second receiving buffer 6i by busy communication from the utilization portion 2i.

FIG. 18 will be referred to. The control portion 11 judges, when it receives busy communication from the utilization portion 2i, whether or not the communication is communication indicating that the utilization portion 2i is not in a busy state (step S1801). In a case where in the judgment at the step S1801, the communication is the communication indicating that the utilization portion 2i is not in a busy state, the control portion 11 further judges whether or not utilization portion data exits in the second receiving buffer 6i (step S1802). On the other hand, in a case where in the judgment at the step S1801, the communication is not the communication indicating that the utilization portion 2i is not in a busy state, the control portion 11 turns the busy flag 7i for the utilization portion 2i which has sent the communication, on (step S1805), thereby terminating the processing for the busy communication.

When the utilization portion data exists in the second receiving buffer 6i in the judgment at the step S1802, the control portion 11 notifies, of the location and the size of the utilization portion data written into the second receiving buffer 6i, the corresponding utilization portion 2i (step S1803).

FIG. 19 will be referred to. The utilization portion 2*i* transcribes, when it receives the above-mentioned notification from the control portion 11, the utilization portion data onto the data transcription area 9*ia* managed by itself from the second receiving buffer 8*i* on the basis of the notification (step S1901), as in the case of the above-mentioned notification relating to the first receiving buffer 8*i*. When the transcription of the data is terminated, the utilization portion 2*i* resends the result of the termination of the transcription to the control portion 11 (step S1902). Thereafter, the utilization portion 2*i* processes the utilization portion data transcribed onto the data transcription area 9*ia* (step S1903).

FIG. 18 will be referred to again. The control portion 11 deletes the utilization portion data, of which the utilization portion 2*i* has been notified, from the second receiving buffer 6*i* upon receipt of the result from the utilization portion 2*i* (step S1804). It is also considered that the transition of the utilization portion 2*i* to the busy state immediately occurs by the notification made at the step S1803, so that the control portion 11 reconfirms the contents of the busy communication after the utilization portion data is deleted at the step S1804 (step S1807). Thereafter, the program is returned to the step S1801. At the step S1801, the confirmed contents of the communication are judged. In the case of the contents of the communication indicating that the utilization portion is in a busy state, the processing for the busy communication is terminated after the processing at the step S1805 is performed. In the case of the contents of the communication indicating that the utilization portion is not in a busy state, it is further judged whether or not the utilization portion data exists in the second receiving buffer 6*i*. On the other hand, when the utilization portion data does not exist in the second receiving buffer 6*i* in the judgment at the step S1802, the control portion 11 turns the busy flag 7*i* for the utilization portion 2*i* which has sent the communication off (step S1806), thereby terminating the processing for the busy communication.

As described in the foregoing, in the communication device according to the fourth embodiment of the present invention, the control portion 11 judges, when the data written into the first receiving buffer 8*i* is utilization portion data, whether or not the utilization portion 2*i* which is the destination of the utilization portion data is in a busy state before the utilization portion data is transcribed onto the second receiving buffer 6*i* (step S1703). When the utilization portion 2*i* which is the destination of the utilization portion data is not in a busy state, by the processing step, the utilization portion data can be directly transcribed onto the data transcription area 9*ia* from the first receiving buffer 8*i* (that is, one transcription processing is sufficient).

Consequently, the communication device according to the fourth embodiment of the present invention, the step of transcribing utilization portion data can be reduced, thereby making it possible to improve communication throughput.

At the step S1701 in FIG. 17, immediately after the received data is written into the first receiving buffer 8*i*, processing for judging the contents of the received data (step S1702) is performed. In another communication system, however, there is a case where all packets from the header part 301 to the ender part 302 as shown in FIGS. 16*a* and 16*b* cannot be transmitted at one time depending on conditions such as the communication speed, and are transmitted in smaller units of packets. In this case, there may be further provided the step of judging whether or not one packet as shown in FIGS. 16*a* and 16*b* is completed by the received data (for example, the judgment may be made depending on whether or not the received data is the ender part 302), to repeatedly receive and write data when the packet is not completed, while making the judgment at the step S1702 in FIG. 17 when it is completed.

Depending on the relationship between the interval of data communication and the processing speed of the control portion 11, a problem occurs that the control portion 11 receives new data while the existing data written into the first receiving buffer 8*i* (that is, one record area) is being subjected to transcription processing, and the new data is written onto the existing data. In order to cope with this problem, a plurality of record areas may be constructed in the first receiving buffer 8*i*, similarly to those in the second receiving buffers 6*i* to 6N (see FIG. 15*b*) so that writing is not performed unless the existing data is deleted at the steps such as the step S1705.

As described in FIG. 16, the data part 303 of the packet is control portion data or utilization portion data. However, a case where both of the data are simultaneously transmitted is also considered depending on the communication system. In the processing shown in FIG. 17 in this case, there may be further provided the step of judging whether or not the data part 303 has both of the data before the judgment at the step S1702, for example. When the data part 303 has both of the data, the program may be returned to the step S1702 again at the time point where the processing at the step S1704, S1706 or S1708 is terminated (without deleting data in the first receiving buffer 8*i*).

Description is now made of the most suitable method of setting the maximum credit value in a case where communication is established using the credit value described in the prior art in the communication device according to the fourth embodiment.

In the fourth embodiment, the maximum credit value is effectively set utilizing the fact that the size of data to be communicated (the data part 303 in FIGS. 16*a* and 16*b*) varies for each communication. Specifically, the control portion 11 finds again, every time a communication request is issued, the maximum credit value to be communicated to a communication device on the transmission side which has sent the communication request. That is, the maximum data size by which the size of the second receiving buffer 6*i* is divided in order to find the maximum credit value is not the fixed maximum data size in a communication system but the maximum data size in the requested communication. For example, suppose the fixed maximum data size in the communication system is "10", and the size of the second receiving buffer 6*i* is a fixed value "120" (a unit is omitted). In this case, in the conventional communication device, the maximum credit value is uniformly "12(=120/10)" in any communication (for example, even in a case where it is previously found that the maximum data size in certain communication is "6"). However, since the communication device according to the fourth embodiment sets the credit value again every time a communication request is issued, in communication in which the maximum data size is "6" as described above, it is possible to set the maximum credit value to "20 (120/6)".

Consequently, the communication device according to the fourth embodiment of the present invention can avoid the overflow of received data by finding the most suitable maximum credit value for each communication, and establish efficient and most suitable data communication.

(Fifth Embodiment)

Figure 21:
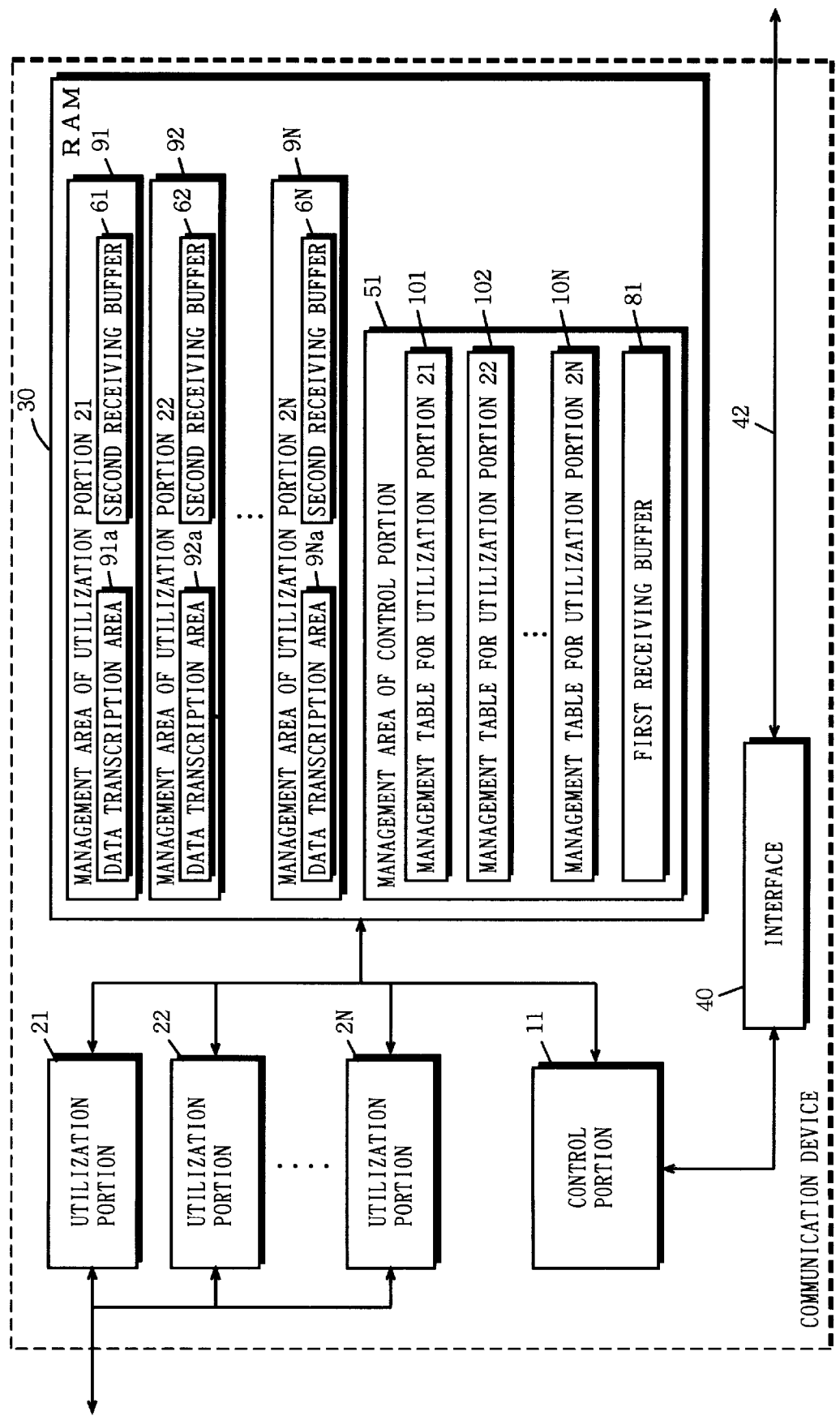
FIG. 21 is a block diagram showing the configuration of a communication device according to a fifth embodiment of the present invention.

FIG. 21 is a block diagram showing the configuration of a communication device according to a fifth embodiment of the present invention. In FIG. 21, the communication device according to the fifth embodiment comprises a control portion 11, a plurality of utilization portions 21 to 2N, a RAM 30, and an interface 40, as in the above-mentioned fourth embodiment.

A control portion managing area 51 has a plurality of management tables 101 to 10N each corresponding to the utilization portions 21 to 2N in place of the second receiving buffers 61 to 6N and the busy flags 71 to 7N in FIG. 14. Utilization portion management areas 91 to 9N respectively have second receiving buffers 61 to 6N in addition to data transcription areas 91a to 9Na. That is, in the fifth embodiment, the second receiving buffers 61 to 6N constructed in the control portion management area 51 in the above-mentioned fourth embodiment are respectively constructed in the utilization portion management areas 91 to 9N. The fact that the second receiving buffers 61 to 6N are respectively constructed in the utilization portion management areas 91 to 9N means that basic setting relating to the second receiving buffers 61 to 6N (the size and the place, on the RAM 30, of the buffer) is performed by each of the utilization portions 21 to 2N. FIG. 22 is a diagram showing the structure of the management tables 101 to 10N. As shown in FIG. 22, each of the management tables 101 to 10N has utilization portion related information, a busy flag, the location and the size of the second receiving buffer, a location for writing in the second receiving buffer, and a location for reading and the size of the second receiving buffer.

The utilization portion related information stores information for judging which utilization portion 2i is related to the management table 10i. The busy flag stores similar information as those of the busy flags 71 to 7N in the fourth embodiment. The location and the size of the second receiving buffer store information relating to the second receiving buffer 6i set by the utilization portion 2i as described above. Information relating to the location and the size of the second receiving buffer are stored by methods such as a method of instructing the control portion 11 when the utilization portion 2i is started. The location for writing in the second receiving buffer stores information as to which place in the second receiving buffer 6i is the place where the control portion 11 should write the subsequent received data. The location for reading and the size of the second receiving buffer store information as to which place in the second receiving buffer 6i is the place where data should be transcribed onto the data transcription area 9ia and what is the size of the data when the utilization portion 2i is not in a busy state.

In the fifth embodiment having the above-mentioned configuration, the control portion 11 shown in FIG. 21 basically performs the operations shown in FIGS. 17 and 18, similarly to the control portion 11 in the fourth embodiment. In the control portion 11 shown in FIG. 21, the operations shown in FIGS. 17 and 18 are performed on the basis of information stored in the management tables 101 to 10i. The utilization portions 21 to 2N in FIG. 21 basically perform the operations shown in FIG. 19, similarly to the utilization portions 21 to 2N in the fourth embodiment.

Description is now made of portions whose processing in the fifth embodiment differs from the processing in the fourth embodiment. In the fifth embodiment, the utilization portions 21 to 2N respectively set areas of the second receiving buffers 61 to 6N and the sizes thereof, as described above. Therefore, initialization processing performed before the control portion 11 processes received data (step S1701 in FIG. 17) is performed for each of the utilization portions 21 to 2N, as shown in FIG. 23a.

Figure 23B:
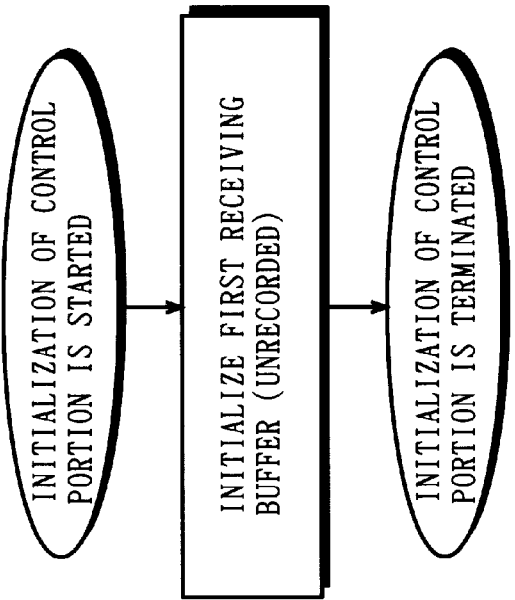
FIGS. 23a and 23b are flow charts showing a part of operations performed by a control portion 11 shown in FIG. 21.
Figure 23A:
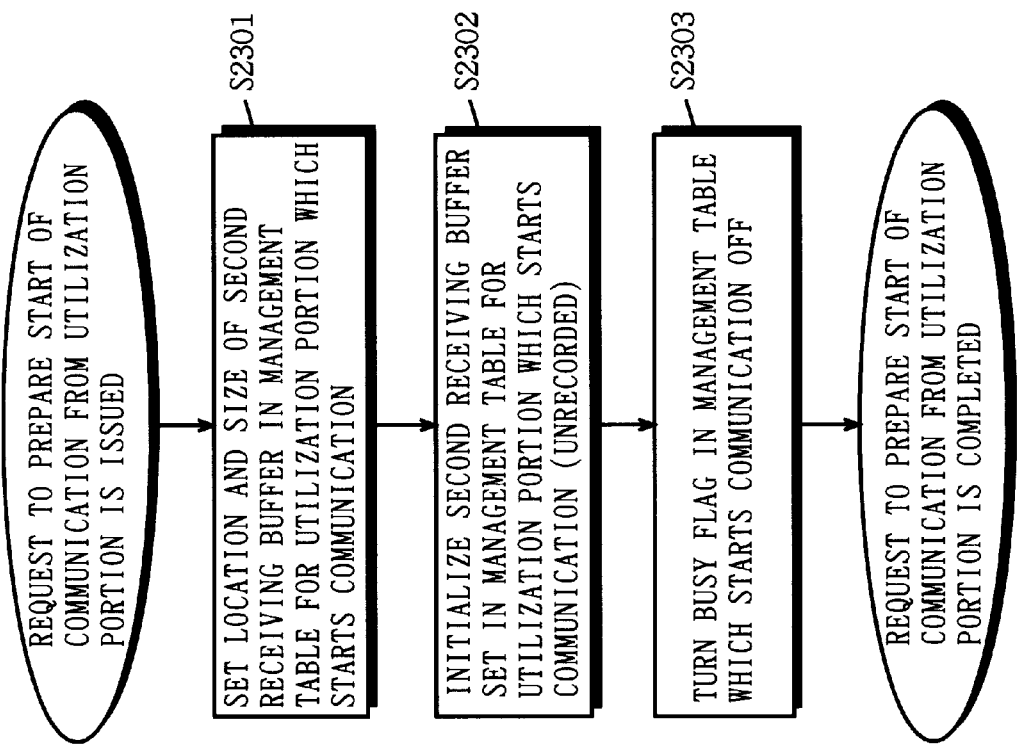
Figure 24:
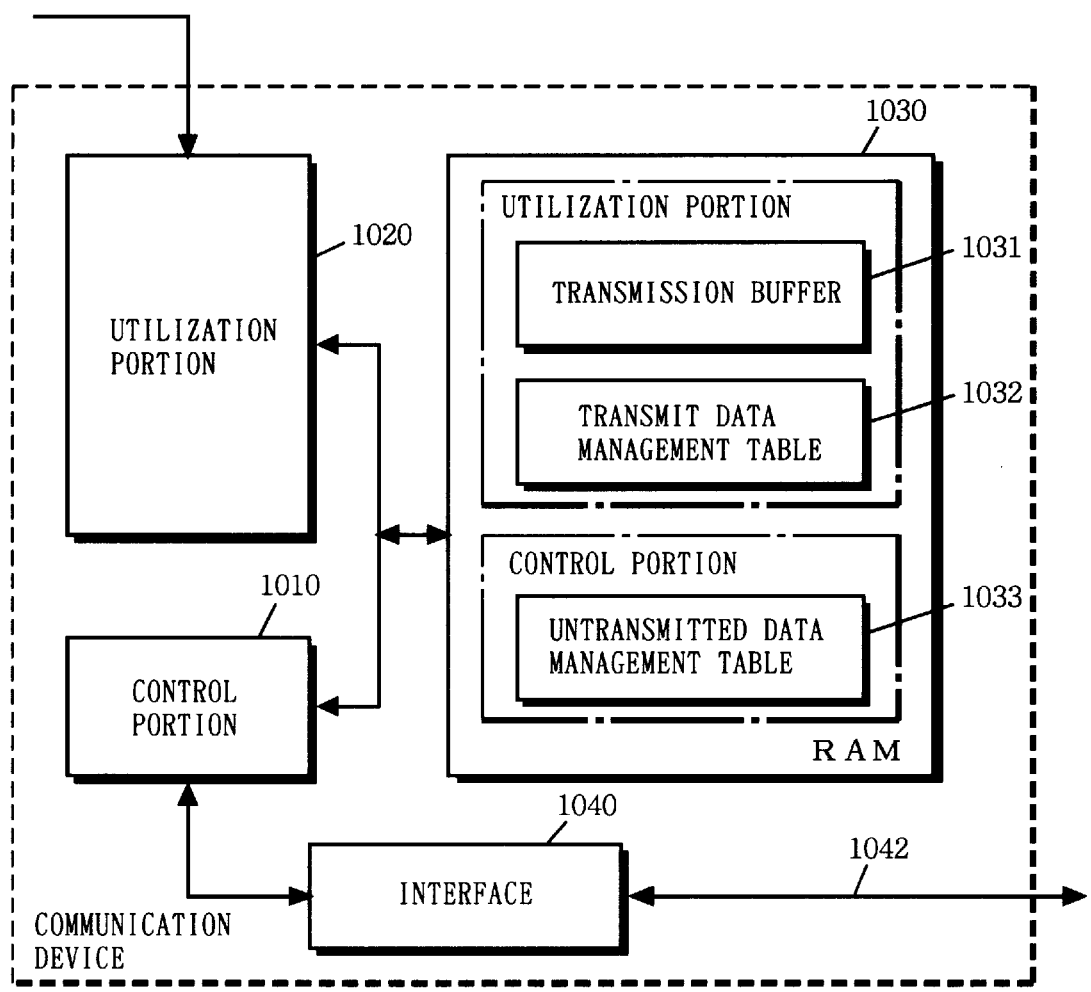
FIG. 24 is a block diagram showing an example of the structure of a transmission portion in a conventional communication device.
Figure 28:
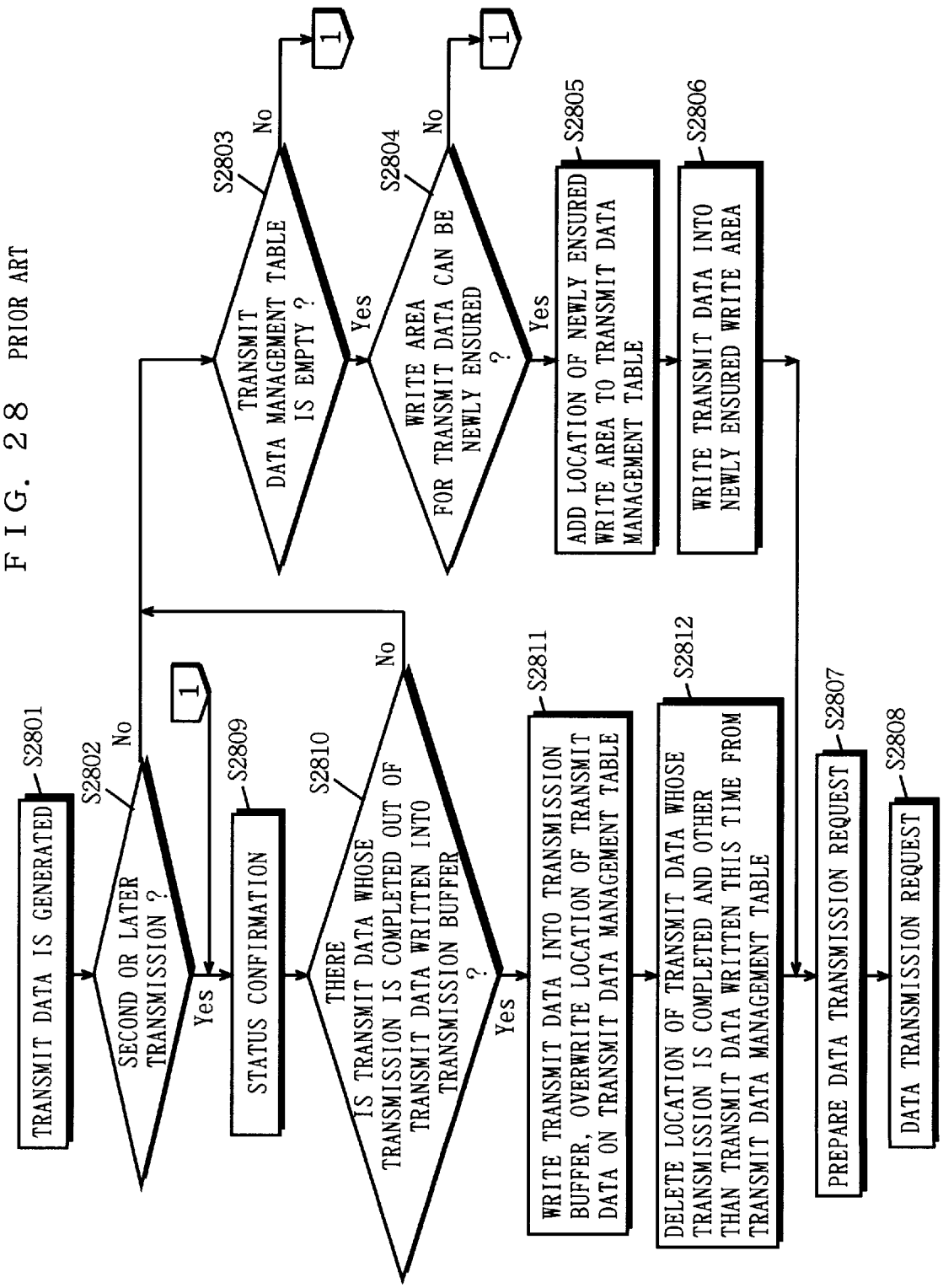
FIG. 28 is a flow chart showing a part of operations performed by a utilization portion 1020 shown in FIG. 24.
Figure 29:
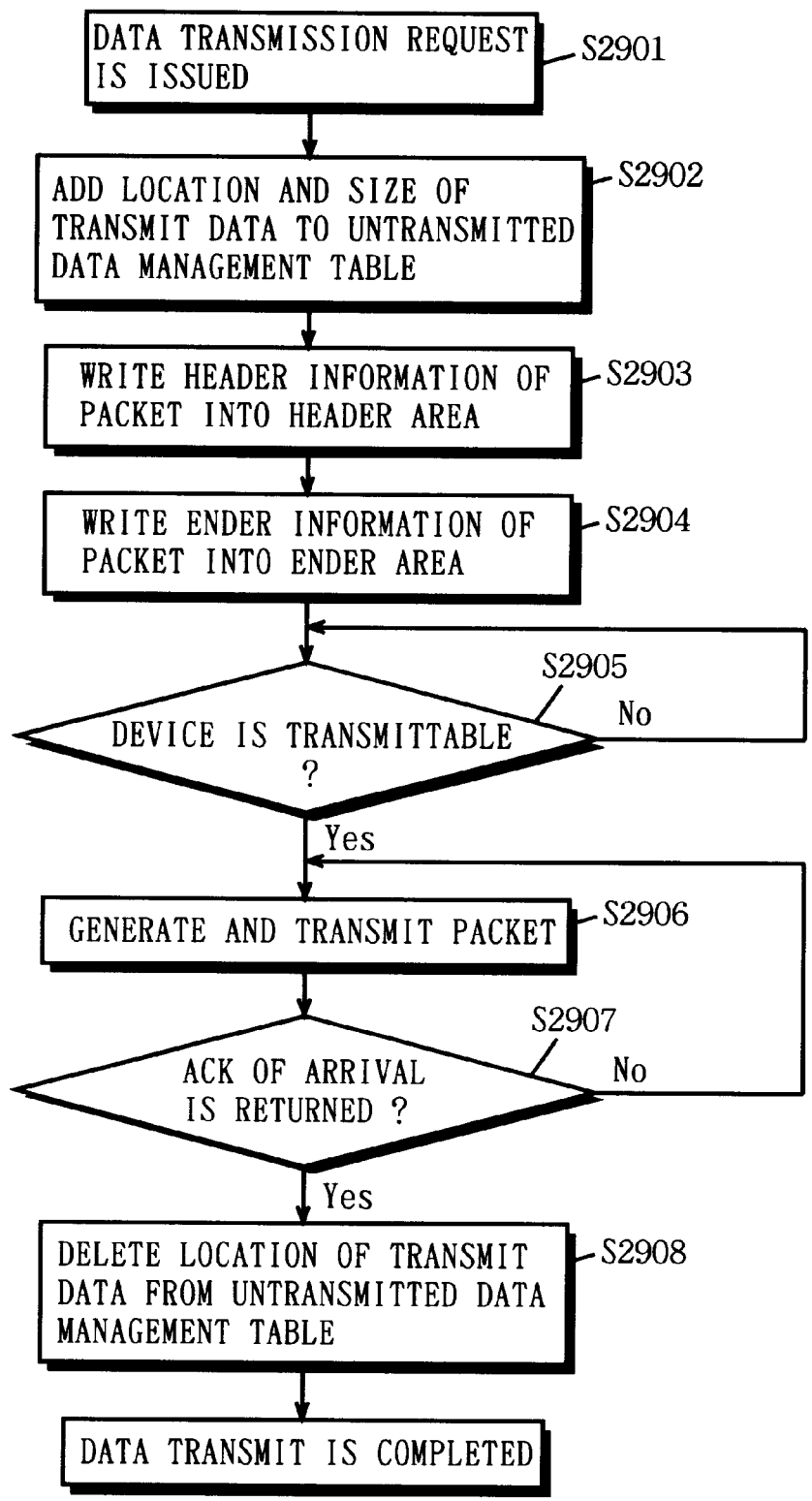
FIG. 29 is a flow chart showing a part of operations performed by a control portion 1010 shown in FIG. 24.
Figure 30:
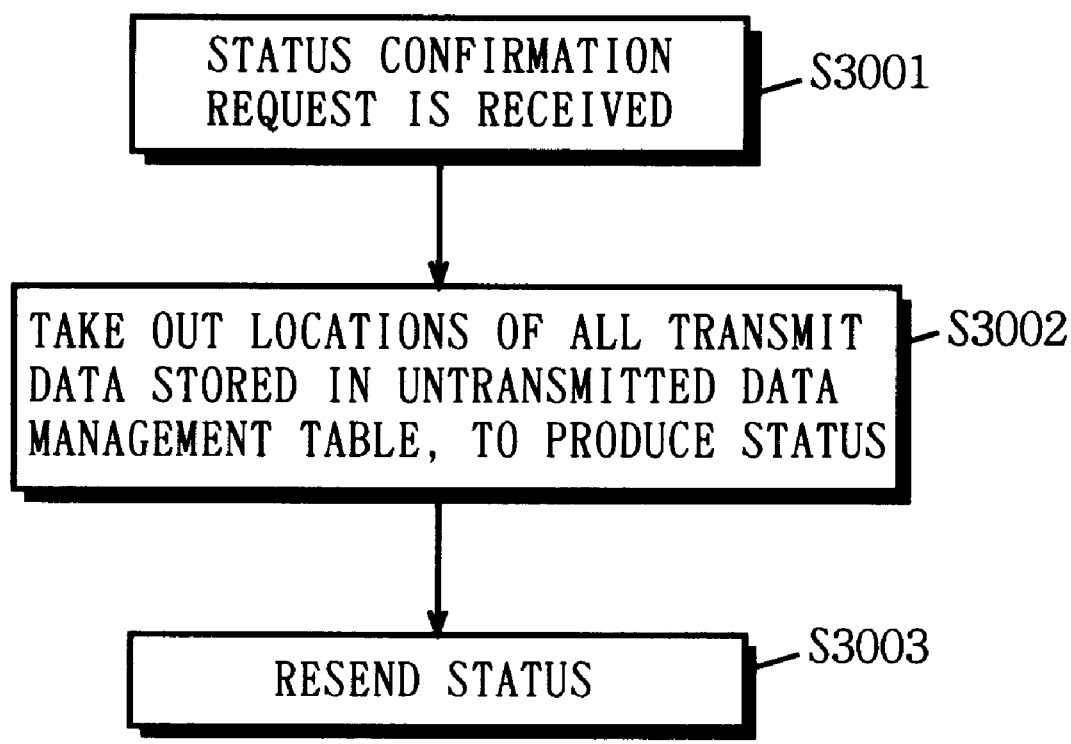
FIG. 30 is a flow chart showing a part of the operations performed by the control portion 1010 shown in FIG. 24.
Figure 31:
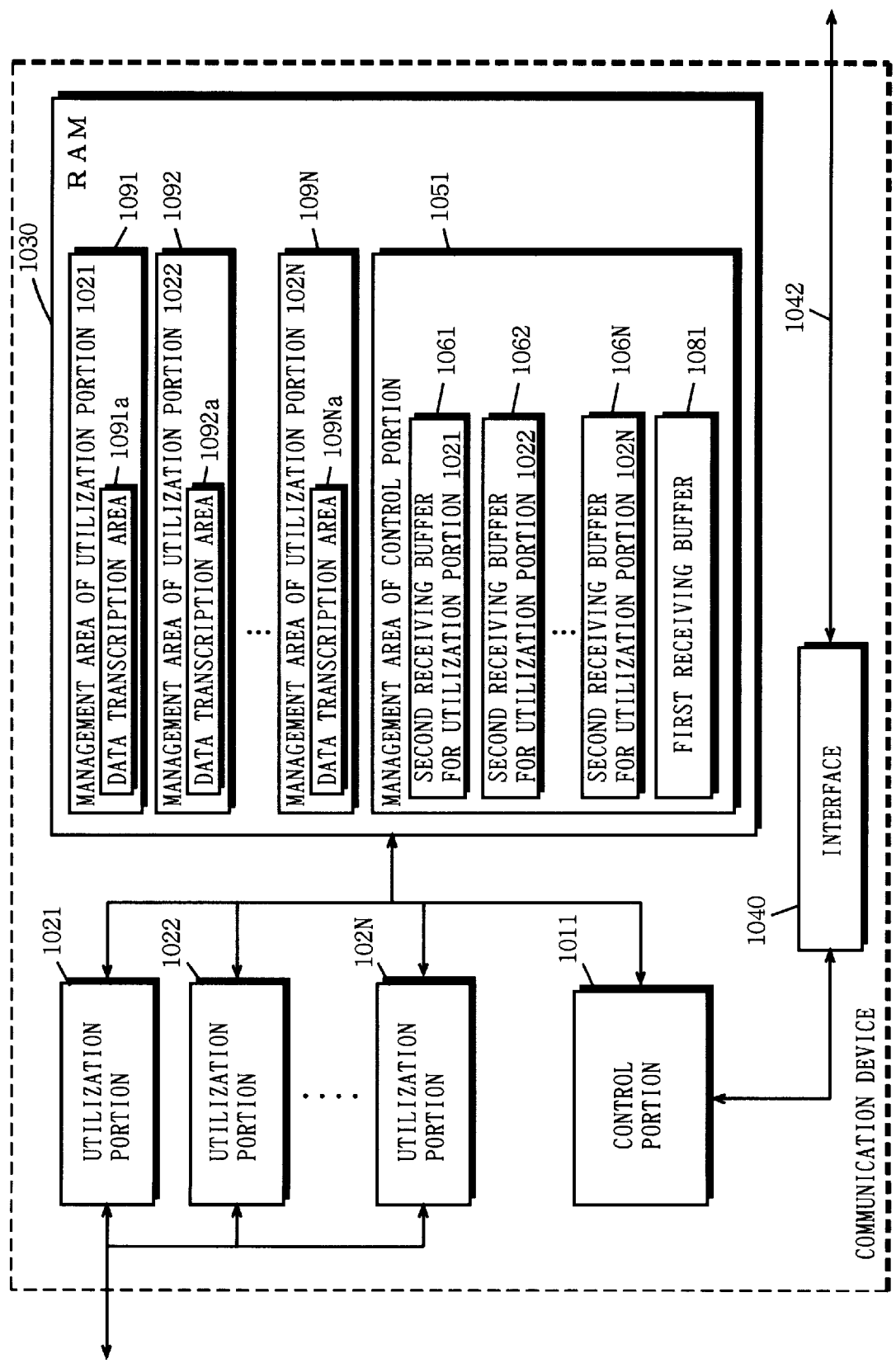
FIG. 31 is a block diagram showing an example of the structure of a receiving portion in a conventional communication device.
Figure 32:
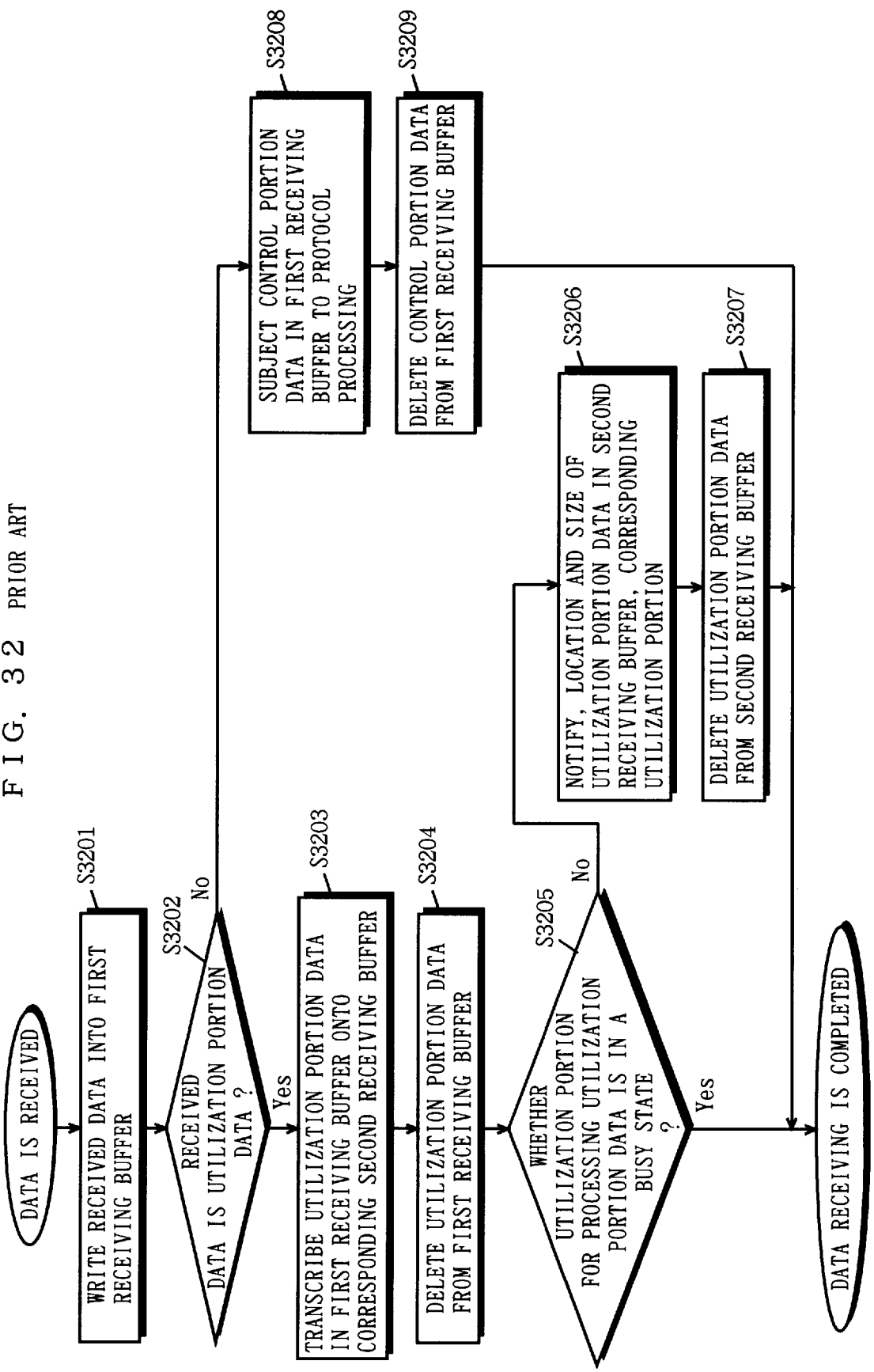
FIG. 32 is a flow chart showing a part of operations performed by a control portion 1011 shown in FIG. 31.
Figure 33:
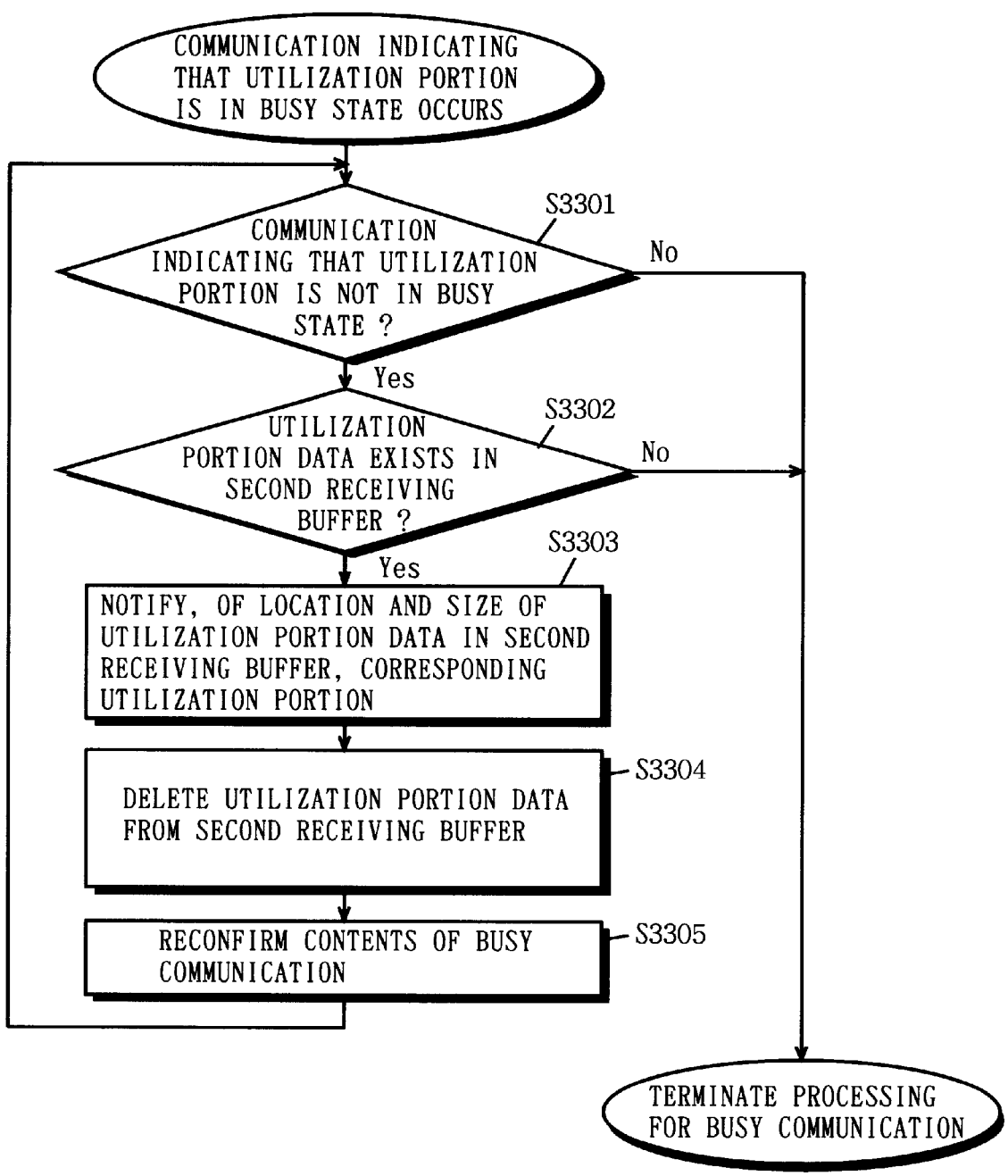
FIG. 33 is a flow chart showing a part of the operations performed by the control portion 1011 shown in FIG. 31.

FIG. 23a will be referred to. The control portion 11 sets the location and the size of the second receiving buffer 6i which are instructed from the utilization portion 2i by issuing a request to prepare the start of communication from the utilization portion 2i in the management table 10i (step S2301), and initializes the second receiving buffer 6i (step S2302). Thereafter, the control portion 11 turns a busy flag in the management table 10i off (step S2303). On the other hand, the first receiving buffer 81 is initialized by the control portion 11, separately from the processing shown in FIG. 23a (FIG. 23b).

As described in the foregoing, in the communication device according to the fifth embodiment of the present invention, as the basic setting of the second receiving buffers 61 to 6N, the control portion 11 does not uniformly perform the same setting, but each of the utilization portions 21 to 2N sets the most suitable size conforming to its own object and processing capabilities.

Consequently, the communication device according to the fifth embodiment of the present invention can effectively utilize its restricted resources.

When communication is established using the above-mentioned credit value in the communication device according to the fifth embodiment of the present invention, the control portion 11 finds again, every time a communication request is issued, the maximum credit value to be communicated to the communication device which has sent the request utilizing the fact that the size of data to be communicated varies for each communication, as in the fourth embodiment.

The size of the second receiving buffer 6i in the fifth embodiment is not uniformly the fixed size, for example, as the size of the second receiving buffer 6i in the fourth embodiment but the size most suitably set by each of the utilization portions 21 to 2N. Accordingly, the maximum credit value obtained in the fifth embodiment is found from the maximum data size in the requested communication and the most suitably set size of the second receiving buffer 6i.

Therefore, the communication device according to the fifth embodiment of the present invention can avoid the overflow of received data by finding the maximum credit value most suitable for each communication and can establish more efficient and most suitable data communication.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication device comprising a utilization portion for performing arbitrary application processing, a control portion for packet-transmitting transmit data generated in said utilization portion to an exterior in accordance with a previously determined protocol, and a memory which is shared between said utilization portion and said control portion, wherein:

said memory comprises a transmission buffer, having a plurality of data write areas for temporarily storing the transmit data generated in said utilization portion, and a header information write area and an ender information write area in the order of constructing a transmitting packet which are provided in relation to each of the data write areas, for further managing a state where the transmit data stored in the data write area is transmitted;

said utilization portion outputs, when the transmit data is generated, a request to acquire the data write area in said transmission buffer to said control portion, said control portion refers, when the request for acquisition is issued, to said transmission buffer, to specify the data write area where writing is newly allowed in said transmission buffer and present the data write area to said utilization portion;

said utilization portion writes the transmit data into the data write area, which has been presented from said control portion, in said transmission buffer;

said control portion respectively writes header information and ender information into said header information write area and said ender information write area in processes carried out after accepting a request to transmit the transmit data from said utilization portion until the transmission of a packet including the transmit data is started, to complete the transmitting packet in said transmission buffer; and said control portion realizes packet communication by transmitting the transmitting packet completed in said transmission buffer.

2. A communication device comprising a utilization portion for performing arbitrary application processing, a control portion for transmitting transmit data generated in said utilization portion or fixed data previously retained inside said communication device to an exterior in accordance with a previously determined protocol, and a memory which is shared between said utilization portion and said control portion, wherein:

said memory comprises:
a transmission buffer, having a plurality of data write areas for temporarily storing transmit data newly generated in said utilization portion, and a header information write area and an ender information write area which are provided in relation to each of said data write areas, for further managing a state where the transmit data stored in the data write area is transmitted;

a fixed data storage portion for storing said fixed data; and a management table for managing a state where each of the fixed data, whose request for transmission from said utilization portion has been accepted by said control portion, is transmitted and the location, on said fixed data storage portion, of the fixed data;

said utilization portion outputs, when the transmit data is generated, a request to acquire the data write area in said transmission buffer to said control portion;

said control portion refers, when said request for acquisition is issued, to said transmission buffer, to specify the data write area where writing is newly allowed in said transmission buffer and present the data write area to said utilization portion;

said utilization portion writes the transmit data into the data write area, which has been presented from said control portion, in said transmission buffer;

said control portion respectively writes header information and ender information into said header information write area and said ender information write area in processes carried out after accepting a request to transmit the transmit data from said utilization portion until the transmission of a packet including the transmit data is started, to complete the transmitting packet in said transmission buffer; and said control portion registers, in a case of accepting the request to transmit the fixed data from said utilization portion, the location, on said fixed data storage portion, of the fixed data in said management table.

3. A communication device comprising a control portion for processing data received from another communication device through an interface in accordance with a previously determined protocol, a plurality of utilization portions for performing application processing of the data transferred from said control portion, and a memory which is shared between said control portion and said plurality of utilization portions, wherein:

said memory comprises:
a first receiving buffer having one or two or more data write areas for temporarily storing the data received by said control portion; and a plurality of second receiving buffers respectively corresponding to said plurality of utilization portions and each having a plurality of data write areas for further temporarily storing the data written into said first receiving buffer;

said control portion;
confirms, when the data written into said first receiving buffer is utilization portion data whose processing should be performed by said utilization portion, a state where said utilization portion which is the destination of the utilization portion data is used;

writes, when the state where said utilization portion is used is a state where it is impossible to accept the utilization portion data, the utilization portion data into said second receiving buffer; and notifies, when the state where said utilization portion is used is a state where it is possible to accept the utilization portion data, said utilization portion of the location and the size of the utilization portion data written into said first receiving buffer; and said utilization portion reads said utilization portion data from said first receiving buffer upon receipt of said notification.

4. The communication device according to claim 3, wherein:
the locations and the sizes of said plurality of second receiving buffers are respectively set by said plurality of utilization portions.

5. The communication device according to claim 3, wherein:
said control portion further comprises means for previously communicating, prior to communicating data, the number of times the data can be continuously received to said other communication device;

said control portion finding, every time data communication is established, the number of times said data can be continuously received by calculation from the size of said second receiving buffer and the maximum size of the data which can be transmitted in the established communication.

6. The communication device according to claim 4, wherein:
said control portion further comprises means for previously communicating, prior to communicating data, the number of times the data can be continuously received to said other communication device;

said control portion finding, every time data communication is established, the number of times said data can be continuously received by calculation from the size of said second receiving buffer and the maximum size of the data which can be transmitted in the established communication.

7. A communication method used in a communication device comprising a utilization portion for performing arbitrary application processing, a control portion for packet-transmitting transmit data generated in the utilization portion to an exterior in accordance with a previously determined protocol, and a memory which is shared between the utilization portion and the control portion, wherein:

said memory comprises a transmission buffer, having a plurality of data write areas for temporarily storing the transmit data generated in the utilization portion, and a header information write area and an ender information write area in the order of constructing a transmitting packet which are provided in relation to each of the data write areas, for further managing a state where the transmit data stored in the data write area is transmitted;

the communication method comprising:

the step in said utilization portion of outputting, when the transmit data is generated, a request to acquire the data write area in said transmission buffer to the control portion;

the step in the control portion of referring, when said request for acquisition is issued, to the transmission buffer, to specify the data write area where writing is newly allowed in the transmission buffer and present the data write area to the utilization portion;

the step in the utilization portion of writing the transmit data into the data write area, which has been presented from the control portion, in the transmission buffer;

the step in the control portion of respectively writing header information and ender information into the header information write area and said ender information write area in processes carried out after accepting the request to transmit the transmit data from the utilization portion until the transmission of a packet including the transmit data is started, to complete the transmitting packet in the transmission buffer; and the step in the control portion of transmitting the transmitting packet is completed in the transmission buffer.

8. A communication method used in a communication device comprising a utilization portion for performing arbitrary application processing, a control portion for transmitting transmit data generated in the utilization portion or fixed data previously retained inside the device to an exterior in accordance with a previously determined protocol, and a memory which is shared between the utilization portion and the control portion, wherein:

the memory comprises:

a transmission buffer, having a plurality of data write areas for temporarily storing transmit data newly generated in the utilization portion, and a header information write area and an ender information write area which are provided in relation to each of the data write areas, for further managing a state where the transmit data stored in the data write area is transmitted;

a fixed data storage portion for storing said fixed data; and a management table for managing a state where each of the fixed data, whose request for transmission from the utilization portion has been accepted by the control portion, is transmitted and the location, on the fixed data storage portion, of the fixed data;

said communication method further comprising:

the step in the utilization portion of outputting, when the transmit data is generated, a request to acquire the data write area in the transmission buffer to the control portion;

the step in the control portion of referring, when said request for acquisition is issued, to the transmission buffer, to specify the data write area where writing is newly allowed in the transmission buffer and present the data write area to the utilization portion;

the step in the utilization portion of writing the transmit data into the data write area, which has been presented from the control portion, in the transmission buffer;

the step in the control portion of respectively writing header information and ender information into the header information write area and the ender information write area in processes carried out after accepting a request to transmit the transmit data from the utilization portion until the transmission of a packet including the transmit data is started, to complete the transmitting packet in the transmission buffer; and the step in the control portion of registering, in the case of accepting the request to transmit the fixed data from the utilization portion, the location, on the fixed data storage portion, of the fixed data in the management table.

9. A communication method used in a communication device comprising a control portion for processing data received from another communication device through an interface in accordance with a previously determined protocol, a plurality of utilization portions for performing application processing of the data transferred from the control portion, and a memory which is shared between the utilization portion and the control portion, wherein:

the memory comprises:

a first receiving buffer having one or two or more data write areas for temporarily storing the data received by the control portion; and a plurality of second receiving buffers respectively corresponding to the plurality of utilization portions and each having a plurality of data write areas for further temporarily storing the data written into the first receiving buffer;

said communication method further comprising:

the step in the control portion of confirming, when the data written into the first receiving buffer is utilization portion data whose processing should be performed by the utilization portion, a state where the utilization portion which is the destination of the utilization portion data is used;

the step in the control portion of writing, when the state where the utilization portion is used is a state where it is impossible to accept the utilization portion data, the utilization portion data into the second receiving buffer;

the step in the control portion of notifying, when the state where the utilization portion is used is a state where it is possible to accept the utilization portion data, the utilization portion of the location and the size of the utilization portion data written into the first receiving buffer; and the step in the utilization portion of reading the utilization portion data from the first receiving buffer upon receipt of said notification.

10. The communication method according to claim 9, wherein the locations and the sizes of the plurality of second receiving buffers are respectively set by the plurality of utilization portions.

11. The communication method according to claim 9, further comprising the step in the control portion of communicating, prior to communicating data, the number of times the data can be continuously received to the other communication device;

the control portion finding, every time data communication is established, the number of times the data can be continuously received by calculation from the size of the second receiving buffer and the maximum size of the data which can be transmitted in the established communication.

12. The communication method according to claim 10, further comprising:

the step in the control portion of previously communicating, prior to communicating data, the number of times the data can be continuously received to the other communication device;

the control portion finding, every time data communication is established, the number of times the data can be continuously received by calculation from the size of the second receiving buffer and the maximum size of the data which can be transmitted in the established communication.

13. A recording medium on which a computer program, executed in a communication device comprising a utilization portion for performing arbitrary application processing, a control portion for packet-transmitting transmit data generated in the utilization portion to an exterior in accordance with a previously determined protocol, and a memory which is shared between the utilization portion and the control portion, for realizing a predetermined operational environment on the communication device is recorded, wherein:

the memory comprises a transmission buffer, having a plurality of data write areas for temporarily storing the transmit data generated in the utilization portion, and a header information write area and an ender information write area in the order of constructing a transmitting packet which are provided in relation to each of the data write areas, for further managing a state where the transmit data stored in the data write area is transmitted; and said operational environment comprises:

the step in the utilization portion of outputting, when the transmit data is generated, a request to acquire the data write area in the transmission buffer to the control portion;

the step in the control portion of referring, when said request for acquisition is issued, to the transmission buffer, to specify the data write area where writing is newly allowed in the transmission buffer and present the data write area to the utilization portion;

the step in the utilization portion of writing the transmit data into the data write area, which has been presented from the control portion, in the transmission buffer;

the step in the control portion of respectively writing header information and ender information into the header information write area and the ender information write area in processes carried out after accepting a request to transmit the transmit data from the utilization portion until the transmission of a packet including the transmit data is started, to complete the transmitting packet in the transmission buffer; and the step in the control portion of transmitting the transmitting packet is completed in the transmission buffer.

14. A recording medium on which a computer program, executed in a communication device comprising a utilization portion for performing arbitrary application processing, a control portion for transmitting transmit data generated in the utilization portion or fixed data previously retained inside the device to an exterior in accordance with a previously determined protocol, and a memory which is shared between the utilization portion and the control portion, for realizing a predetermined operational environment on the communication device is recorded, wherein:

the memory comprises:

a transmission buffer, having a plurality of data write areas for temporarily storing transmit data newly generated in the utilization portion, and a header information write area and an ender information write area which are provided in relation to each of the data write areas, for further managing a state where the transmit data stored in the data write area is transmitted;

a fixed data storage portion for storing said fixed data; and a management table for managing a state where each of the fixed data, whose request for transmission from the utilization portion has been accepted by the control portion, is transmitted and the location, on the fixed data storage portion, of the fixed data; and said operational environment comprises:

the step in the utilization portion of outputting, when the transmit data is generated, a request to acquire the data write area in the transmission buffer to the control portion;

the step in the control portion of referring, when said request for acquisition is issued, to the transmission buffer, to specify the data write area where writing is newly allowed in the transmission buffer and present the data write area to the utilization portion;

the step in the utilization portion of writing the transmit data into the data write area, which has been presented from the control portion, in the transmission buffer;

the step in the control portion of respectively writing header information and ender information into the header information write area and the ender information write area in processes carried out after accepting a request to transmit the transmit data from the utilization portion until the transmission of a packet including the transmit data is started, to complete the transmitting packet in said transmission buffer; and the step in the control portion of registering, in a case of accepting the request to transmit the fixed data from the utilization portion, the location, on said fixed data storage portion, of the fixed data in the management table.

15. A recording medium on which a computer program, executed in a communication device comprising a control portion for processing data received from another communication device through an interface in accordance with a previously determined protocol, a plurality of utilization portions for performing application processing of the data transferred from the control portion, and a memory which is shared between the control portion and the utilization portion, for realizing a predetermined operational environment on the communication device is recorded, wherein:

the memory comprises:

a first receiving buffer having one or two or more data write areas for temporarily storing the data received in the control portion;

and a plurality of second receiving buffers respectively corresponding to the plurality of utilization portions and each having a plurality of data write areas for further temporarily storing the data written into the first receiving buffer; and said operational environment comprises:

the step in the control portion of confirming, when the data written into the first receiving buffer is utilization portion data whose processing should be performed by the utilization portion, a state where the utilization portion which is the destination of the utilization portion data is used;

the step in the control portion of writing, when the state where the utilization portion is used is a state where it is impossible to accept the utilization portion data, the utilization portion data into the second receiving buffer;

the step in the control portion of notifying, when the state where the utilization portion is used is a state where it is possible to accept the utilization portion data, the utilization portion of the location and the size of the utilization portion data written into the first receiving buffer; and the step in the utilization portion of reading the utilization portion data from said first receiving buffer upon receipt of the notification.

16. The recording medium according to claim 15, wherein:

the locations and the sizes of the plurality of second receiving buffers are respectively set by the plurality of utilization portions.

17. The recording medium according to claim 15, wherein:

said operational environment further comprises the step in the control portion of previously communicating, prior to communicating data, the number of times the data can be continuously received to the other communication device;

the control portion finding, every time data communication is established, the number of times the data can be continuously received by calculation from the size of the second receiving buffer and the maximum size of the data which can be transmitted in the established communication.

18. The recording medium according to claim 16, wherein:

said operational environment further comprises the step in the control portion of previously communicating, prior to communicating data, the number of times the data can be continuously received to the other communication device;

said control portion finding, every time data communication is established, the number of times the data can be continuously received by calculation from the size of the second receiving buffer and the maximum size of the data which can be transmitted in the established communication.

* * * * *